United States Patent
Kaneko

(10) Patent No.: US 6,832,731 B2
(45) Date of Patent: Dec. 21, 2004

(54) MEMORY CARD AND CONTENTS DISTRIBUTING SYSTEM AND METHOD

(75) Inventor: Yoshio Kaneko, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 63 days.

(21) Appl. No.: 10/289,785

(22) Filed: Nov. 7, 2002

(65) Prior Publication Data

US 2003/0085289 A1 May 8, 2003

(30) Foreign Application Priority Data

Nov. 8, 2001 (JP) ........................................ 2001-342819

(51) Int. Cl.⁷ .............................................. G06K 19/06
(52) U.S. Cl. ........................ 235/492; 235/379; 235/380; 361/736; 361/737
(58) Field of Search ................................ 235/380, 492, 235/379, 493; 713/189, 193; 369/30.05–30.19; 361/736, 737

(56) References Cited

U.S. PATENT DOCUMENTS

| 5,787,399 | A | * | 7/1998 | Lee et al. ..................... 704/270 |
| 6,467,016 | B1 | * | 10/2002 | Kanai .......................... 711/103 |
| 6,513,719 | B1 | * | 2/2003 | Imura .......................... 235/492 |
| 6,523,117 | B2 | * | 2/2003 | Oki et al. ..................... 713/189 |
| 6,606,707 | B1 | * | 8/2003 | Hirota et al. ................ 713/172 |

FOREIGN PATENT DOCUMENTS

| JP | 2000-148945 | 5/2000 |
| JP | 2000-347696 | 12/2000 |
| JP | 2000-357371 | 12/2000 |
| JP | 2001-67794 | 3/2001 |
| JP | 2001-125961 | 5/2001 |

OTHER PUBLICATIONS

Nikkei Electronics, No. 738, pp. 94–98, Mar. 8, 1999 (in Japanese).

* cited by examiner

Primary Examiner—Karl D. Frech
Assistant Examiner—Ahshik Kim
(74) Attorney, Agent, or Firm—Frommer Lawrence & Haug LLP

(57) ABSTRACT

A memory card is disclosed, which comprises a content interface, an interface driver, a card interface controller, a security processing section which supplies an encryption key to the card interface controller upon a content reproduction request, a memory core interface including a binary counter which counts one of the amount and the number of times of content reproduced, in response to a request for reproduction of a content, and a memory core which records one of the amount and the number of times of content reproduced, if a request for reproduction of a content is input to the memory core, the memory core outputting the encrypted content to the memory core interface if the reproduction request does not cause one of the amount and the number of times of possible content reproduction to be exceeded.

6 Claims, 15 Drawing Sheets

MEMORY CARD AND CONTENTS DISTRIBUTING SYSTEM AND METHOD

CROSS-REFERENCE TO RELATED APPLICATIONS

This application is based upon and claims the benefit of priority from the prior Japanese Patent Application No. 2001-342819, filed Nov. 8, 2001, the entire contents of which are incorporated herein by reference.

BACKGROUND OF THE INVENTION

1. Field of the Invention

The present invention relates to a contents distributing system and method for a memory card on which contents such as music data are recorded, and in particular, to a memory card having a security function and a contents distributing system and method.

2. Description of the Related Art

The use of a memory card for enjoying digital contents such as music or games has been started as a purchasing method called a "reproduction limited" service in which the period or number of possible reproductions is limited to reduce set prices. Thus, manufacture costs and thus contents prices have decreased compared to package media such as CDs (Compact Discs), which are purchased and owned by users so that the contents can be reproduced at any time and any number of times.

However, to further reduce the contents prices, efforts must be made to limit the period of time over which contents can be reproduced for enjoyment or the number of reproductions. With the current memory card, a user obtains data on the number of times of use upon purchasing contents so that the number of times of use can be counted at the start or end of reproduction. However, the length of reproduction time may vary with the content or reproduction may be stopped before the content ends. Consequently, the count may be unfair, and thus this method was difficult to facilitate. That is, it is difficult to determine when to count the number of reproductions. For example, if this number is counted at the start of each song, a counting operation may be performed during a head search. Further, if the number is counted at the end of each song, the user may stop reproduction before the song ends and then listen to it from the beginning again. This enables the user to avoid being counted up. Furthermore, even if the number is counted in the middle of each song, the user can similarly avoid being counted up by stopping reproduction immediately before the count-up operation. To prevent this situation to achieve fairness, the amount of data reproduced must be counted. However, it was technically difficult to carry out this counting with the current memory card. That is, the memory card could not be provided with a function of keeping up with a reproduction speed to count the amount of data reproduced.

That is, the counting operation cannot be attained without relying on a count processing function of external equipment. Accordingly, such external equipment may modified to cheat at the count. Further, the memory card can be incorporated into various types of reproducing equipment so as to reproduce contents. To allow the amount of data reproduced to be counted, all of the various pieces of external equipment must be provided with a function of counting this amount. This is cumbersome, and particularly in the case of portable equipment, may impair its characteristics of being compact and portable. Further, if only some pieces of external equipment have a count function, data is reproduced from the memory card using only these pieces of equipment. Consequently, reproduction means for the memory card is limited.

SD (Security Digital) cards and other memory cards having security functions store encrypted contents data and decryption key data used to decrypt the contents data, and use both data to reproduce the contents while decrypting the data. A serial number specific to each memory card is checked, and on the basis of this serial number, a decryption key is made and transmitted. Accordingly, even if all of the contents data and decryption key are copied to another memory card, the data cannot be decrypted. The contents data can be copied to another memory card, but if they are actually copied, information is recorded in the decryption key of the source memory card, indicating that the contents data has been copied to the different memory card. Thus, reproduction cannot be achieved using this memory card. That is, although the contents can be moved from one memory medium to another, they can be used by only one memory medium which has been purchased by the user. Further, if the contents are reproduced, the type of reproducing equipment is checked so that the data is sent out only to equipment having a registered security function. This prevents the contents from being illegally copied. Memory cards having such security functions constitute systems that can prevent the contents from being illegally copied.

Now, with reference to FIG. 16, description will be given of a process of writing contents to a conventional SD card. A SD card 200 is connected to a contents vending machine 201. The SD card 200 has a card interface controller 202, a memory core 203, a protect memory core 204, and a key information recording section 205. The contents vending machine 201 has a contents recording section 206 and an encrypting section 207. Then, a user inputs a content write request 208 to the contents vending machine 201. In response to the content write request 208, the contents vending machine 201 outputs a key request to the card interface controller 202 of the memory card 200. Then, upon receiving the key request, the card interface controller 202 outputs a request to the key information recording section 205. Then, the key information recording section 205 outputs key information to the card interface controller 202. Subsequently, the card interface controller 202 outputs the key information to the encrypting section 207.

Next, the encrypting section 207 outputs a corresponding decryption key and encrypted content to the card interface controller 202. Then, the card interface controller 202 outputs the decryption key to the protect memory core 204 and the encrypted content to the memory core 203. The content is then written to the SD memory card 200.

In this case, the decryption key data is organized as shown in FIG. 17. A content name 209 specifying decryption data 210 is recorded as a part of the decryption key data. Furthermore, copy status data 211 is recorded as a part of the decryption key data. The copy status data is recorded as "1" if, for example, the content specified by the content name has already been copied to another SD card. In this case, this SD card is set so that this content cannot be reproduced. This is to prevent unlimited illegal copying. On the other hand, "0" is recorded if the content has not been copied to any other SD cards. Thus, the SD card is set so that this content can be reproduced providing that the other conditions are met. Furthermore, count data 217 of possible reproductions remaining is recorded in the decrypting data.

Now, with reference to FIG. 18, description will be given of a conventional counting method used to reproduce data.

In FIG. 18, the SD card is assumed to store encrypted data, decryption key data used to decrypt the encrypted data, and count data accompanying the decryption key data and indicating the counted number of reproductions remaining. The encrypted data contains, for each of the contents, a file name and a pair of decryption key data and count data on the number of reproductions remaining. That is, the SD card stores as many these sets of data as the contents. The encrypted data, decryption key, and remaining reproduction number count data are stored in a nonvolatile memory. An SD memory reproducing device 212 has a decrypting section 213 and a content output section 214. The SD memory reproducing device 212 further comprises a counter 216. The counter 216 receives the count data of the number of reproductions remaining attached to the decryption key through the decryption to make an initial setting of the number of reproductions remaining, count the number of plays such as music plays and inform an information of the number of possible reproductions still remaining to the decrypting device. The decrypting device no longer decrypts when the number of reproductions remaining reaches zero.

First, a request 215 for a read of a specific content is externally input to the SD memory reproducing device 212. Then, the SD memory reproducing device 212 outputs a key request to the card interface controller 202. Then, the key information recording section 205 outputs key information to the card interface controller 202. Then, the card interface controller 202 outputs the key information to the decrypting section 213. Furthermore, the card interface controller 202 outputs a decryption key request to the protect memory core 204. Then, the protect memory core 204 outputs a decryption key and a count data of the number of reproductions remaining to the card interface controller 202. Then, the card interface controller 202 outputs the decryption key and a count data of the number of reproductions remaining to the decrypting section 213. The count data of the number of reproductions remaining is set in a counter of the reproducing device.

Next, the SD reproducing device 212 outputs a content request to the card interface controller 202. Then, the card interface controller 202 outputs the content request to the memory core 203. Then, the memory core 203 outputs a corresponding encrypted content to the card interface controller 202. Then, the card interface controller 202 outputs the encrypted content to the decrypting section 213.

Thus, on the basis of the input key information, the decrypting section 213 uses the decryption key to decrypt and output the encrypted content to the user via the content output section 214. That is, the decryption key data from the SD memory card is transmitted to the decoder in the external equipment. The decrypted data is sequentially reproduced in the external equipment. The external equipment converts the transmitted data into music, game software, or book data to entertain the equipment user. The count value of the counter of the reproducing device is decremented by one each start or end of one tune or one game. The count value data of the counter is transferred to the SD card and overwritten and stored in a file of the count data of the number of reproductions remaining at the time when another tune or game is selected.

Such a method of limiting the number of reproductions is described in "Nikkei Electronics No. 738, pp. 94 to 98; issued on Mar. 8, 1999". Further, a method of limiting the number of reproductions and thus a possible reproduction period or other methods are described in Jpn. Pat. Appln. KOKAI Publication Nos. 2001-125961 and 2001-67794. Jpn. Pat. Appln. KOKAI Publication No. 2000-347696 and other documents describe methods of incrementing the number of reproductions after a specified period of reproduction time has elapsed. Further, Jpn. Pat. Appln. KOKAI Publication No. 2000-357371 describes a method of limiting the number of reproductions in an SD card. Furthermore, Jpn. Pat. Appln. KOKAI Publication No. 2000-148945 and other documents describe a technique of automatically removing unwanted information in an IC card to effectively utilize memory resources.

These conventional memory cards create the following problems:

A problem with the conventional memory cards is that different contents require the respective data utilization styles. Since music data is utilized by sequentially reproducing provided data, no significant problems occur even if the number of reproductions remaining is decremented at the beginning of each song. However, listening to a song only for a short time before stopping playing it is also counted as one reproduction. Also disadvantageously, some users desire to listen to only the former half of a song. A more serious problem occurs with book data. Most readers do not repeat reading the same part of a long novel or the like but sequentially read it little by little. As a result, the number of reproductions increments each time the apparatus is powered off, though the user actually reads through this novel only once.

Under these circumstances, there has been a strong demand for a limit on the reproduction of contents based on the amount of data reproduced in order to achieve fairness. If a counter is provided to count the number of reproductions and if it is provided in a reproducing device, then all reproducing devices must be provided with counters. This is a burden on the reproducing devices. Furthermore, if a counter is provided in the memory card main body, it is large in size compared to the size of the memory card, thus preventing a reduction in the size of the memory card. Accordingly, a small-sized memory card has been desired for which high security is ensured.

BRIEF SUMMARY OF THE INVENTION

According to an aspect of the invention, there is provided a memory card comprising an interface which receives an input content from external equipment and outputs a content to the external equipment; an interface driver which drives the interface; a card interface controller which receives an input signal from the interface driver and outputs a signal to the interface driver; a security processing section controlled by the card interface controller to supply an encryption key to the card interface controller upon a content reproduction request; a memory core interface controlled by the security processing section and the card interface controller and including a binary counter which counts one of the amount of content reproduced and the number of times of content reproduced, in response to a request for reproduction of a content, and a memory core to and from which a content is written, read, and deleted by the memory core interface and which records one of the amount of content reproduced and the number of times of content reproduced, if a request for reproduction of a content is input to the memory core, the memory core outputting the encrypted content to the memory core interface if the reproduction request does not cause one of the amount of possible content reproduction and the number of times of possible content reproduction to be exceeded.

According to another aspect of the invention, there is provided a memory card comprising an interface which receives an input content from external equipment and outputs a content to the external equipment and which receives an input content automatic deletion signal; an interface driver which drives the interface; a card interface controller which receives an input signal from the interface driver and outputs a signal to the interface driver; a security processing section controlled by the card interface controller to supply an encryption key to the card interface controller upon a content reproduction request; a memory core interface controlled by the security processing section and the card interface controller and including a binary counter which counts one of the amount of content reproduced and the number of times of content reproduced, in response to a request for reproduction of a content, the memory core interface outputting a request for deletion of an encrypted content and an encryption key if the content automatic deletion request is input to the memory core interface, and a memory core to and from which a content is written, read, and deleted by the memory core interface and which records one of the amount of content reproduced and the number of times of content reproduced, if a request for reproduction of a content is input to the memory core, the memory core outputting the encrypted content to the memory core interface if the reproduction request does not cause one of the amount of possible content reproduction and the number of times of possible content reproduction to be exceeded, the memory core deleting the encrypted content and the encryption key if the memory core receives a request for deletion of the encrypted content and the encryption key.

According to a further aspect of the invention, there is provided a contents distributing system comprising a request permission determining circuit which receive a content supply request from a user to determine whether or not to permit the request; a content supply circuit which receives a result of determination made by the request permission determining circuit to supply a content to a memory card, and an encryption key supply circuit which receives the result of determination made by the request permission determining circuit to supply a content-decrypting encryption key to the memory card.

According to a further aspect of the invention, there is provided a contents distributing system comprising a request permission determining circuit which receive a content-decrypting encryption key supply request from a user to determine whether or not to permit the request, and an encryption key supply circuit which receives a result of determination made by the request permission determining circuit to supply a content-decrypting encryption key with possible reproduction amount data to a memory card.

According to a further aspect of the invention, there is provided a contents distributing system comprising a circuit which receives a specification request and a possible reproduction amount request for a content downloaded by a user; a circuit which provides a supply price to the user on the basis of the specified content and the possible reproduction amount, and an encryption key supply circuit which receives a download confirmation instruction from the user to supply a decryption key with the possible reproduction amount data specified in a memory card.

According to a further aspect of the invention, there is provided a method of distributing contents comprising receiving a specification request and a possible reproduction amount request for a content downloaded by a user; providing a supply price to the user on the basis of the specified content and the possible reproduction amount, and receiving a download confirmation instruction from the user to supply a decryption key with the possible reproduction amount data specified in a memory card.

Figures 1, 2:
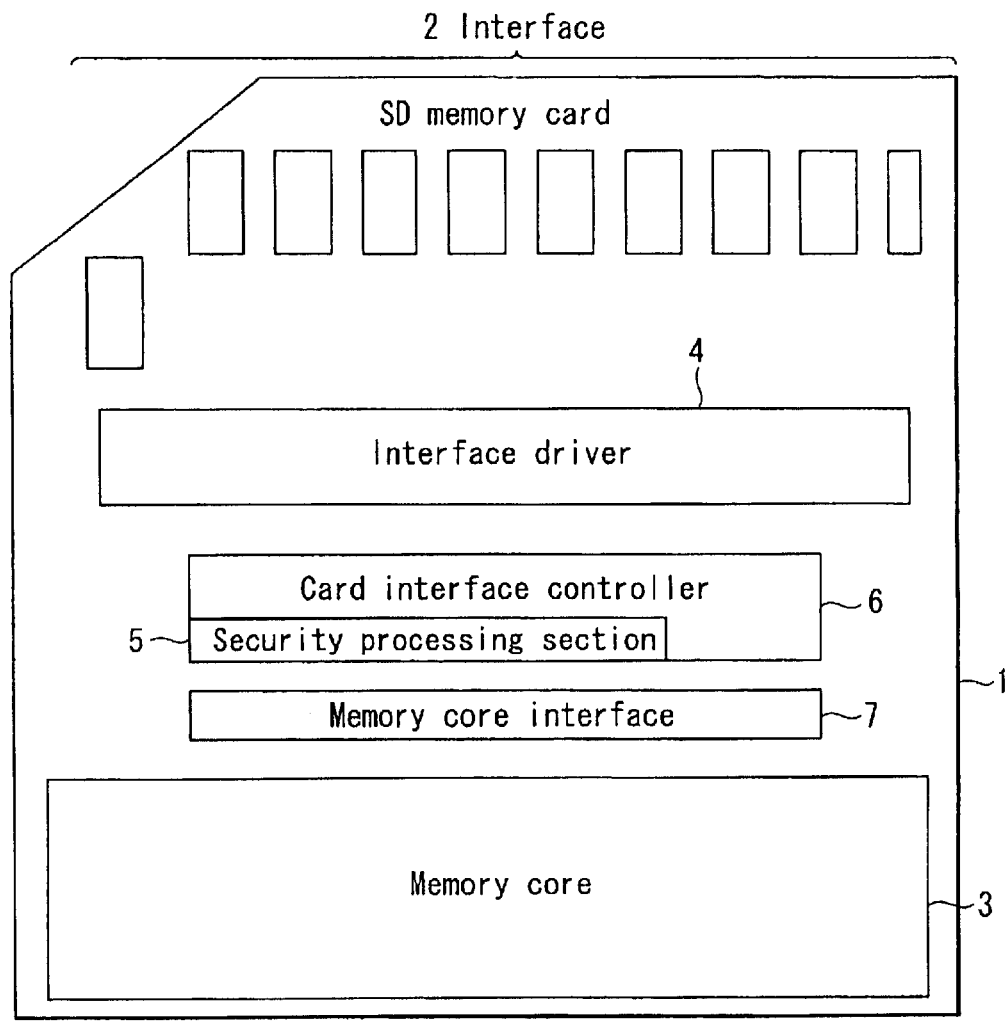
FIG. 1 is a schematic diagram of a memory card according to a first to third embodiments of the present invention.
FIG. 2 is a conceptual drawing illustrating the contents of a decryption key according to the first embodiment of the present invention.

DETAILED DESCRIPTION OF THE INVENTION (First Embodiment)

Taking an SD card by way of example, the entire configuration of a memory card 1 according to this embodiment will be described with reference to FIG. 1. The memory card is provided with an interface (an external terminal, a power terminal, a clock terminal, a data terminal, a command terminal, and other terminals) 2 in an outer peripheral portion. The memory card is internally provided with a memory core (a data saving section) 3 to which downloaded information contents are saved and which is composed of a flash memory or the like, and a control circuit section including a CPU. The control circuit section is provided with an interface driver 4 connected to the external terminal to convert signals, a security processing section (a decrypting circuit) 5 having a security function, a card controller 6, a memory core interface 7, and the like. The flash memory is controlled by the control circuit section, so that complicated control processes specific to the flash memory need not be executed from outside the card.

In this case, the interface 2 receives input contents from external equipment and outputs contents to it. The interface driver 4 drives the interface 2. Furthermore, the card interface controller 6 receives input signals from the interface driver 4 and outputs signals to the interface driver 4. The security processing section 5 is controlled by the card interface controller 6 to supply a decryption key to the card interface controller 6 upon a request for reproduction of a content. The memory core interface 7 is controlled by the security processing section 5 and the card interface controller 6 to count, in response to a content reproduction request, the number of reproductions to calculate the number of possible reproductions.

The memory core interface 7 writes, reads, and deletes contents to and from memory core 3. The memory core 3 records the number of possible reproductions for a content if a request for reproduction of this content is input to the memory core. The memory core 3 outputs the corresponding encrypted content to the memory core interface 7 if the reproduction request does not cause the number of possible reproductions to be exceeded.

Further, to realize a security function, the memory core 3 has a protect area which is separate from a normally accessible user data area and which is only accessible to systems for which accesses are permitted through mutual authentication, as well as key information used for the mutual authentication. If a music content is downloaded into the memory card, the encrypted content is recorded in the user data area. Key information and copy control information used to encrypt this content are saved in the protect area after mutual authentication. The information saved in the protect area can only be copied to those regular systems which are accepted through mutual authentication. To read a content from the memory card, a key used for encryption is read from the protect area and then used to decrypt the content stored in the user data area. Data on a limit on the amount of content used is loaded into the decryption key data.

Now, the decryption key according to this embodiment will be described with reference to FIG. 2. The decryption key is recorded in the memory core 3, and data on the decryption key is updated upon reproduction and copying. A content name 10 specifying a content is recorded as a part of the decryption key data. Furthermore, decryption data 11 is recorded as a part of the decryption key data. Moreover, copy status data 12 is recorded as a part of the decryption key data. The copy status data is recorded are "1" if, for example, the content specified by the content name has already been copied to another SD card. In this case, this SD card is set so that this content cannot be reproduced. This is to prevent unlimited illegal copying. On the other hand, "0" is recorded if the content has not been copied to any other SD cards. Thus, this SD card is so set that this content can be reproduced providing that the other conditions are met.

Furthermore, reproduction number limit data 13 is recorded as a part of the decryption key data. In this case, for example, "0" is recorded if there are no limits on the number of reproductions. On the other hand, for example, "1" is recorded if there is any limit on the number of reproductions. Thus, the memory card is set so that the number of reproductions is limited.

Moreover, possible reproduction number data 14 is recorded as a part of the decryption key data. If the possible reproduction number data 14 is recorded as "0", the memory core 3 is set so that no contents can be read from the memory core 3 even with a content reproduction request.

Figure 3:
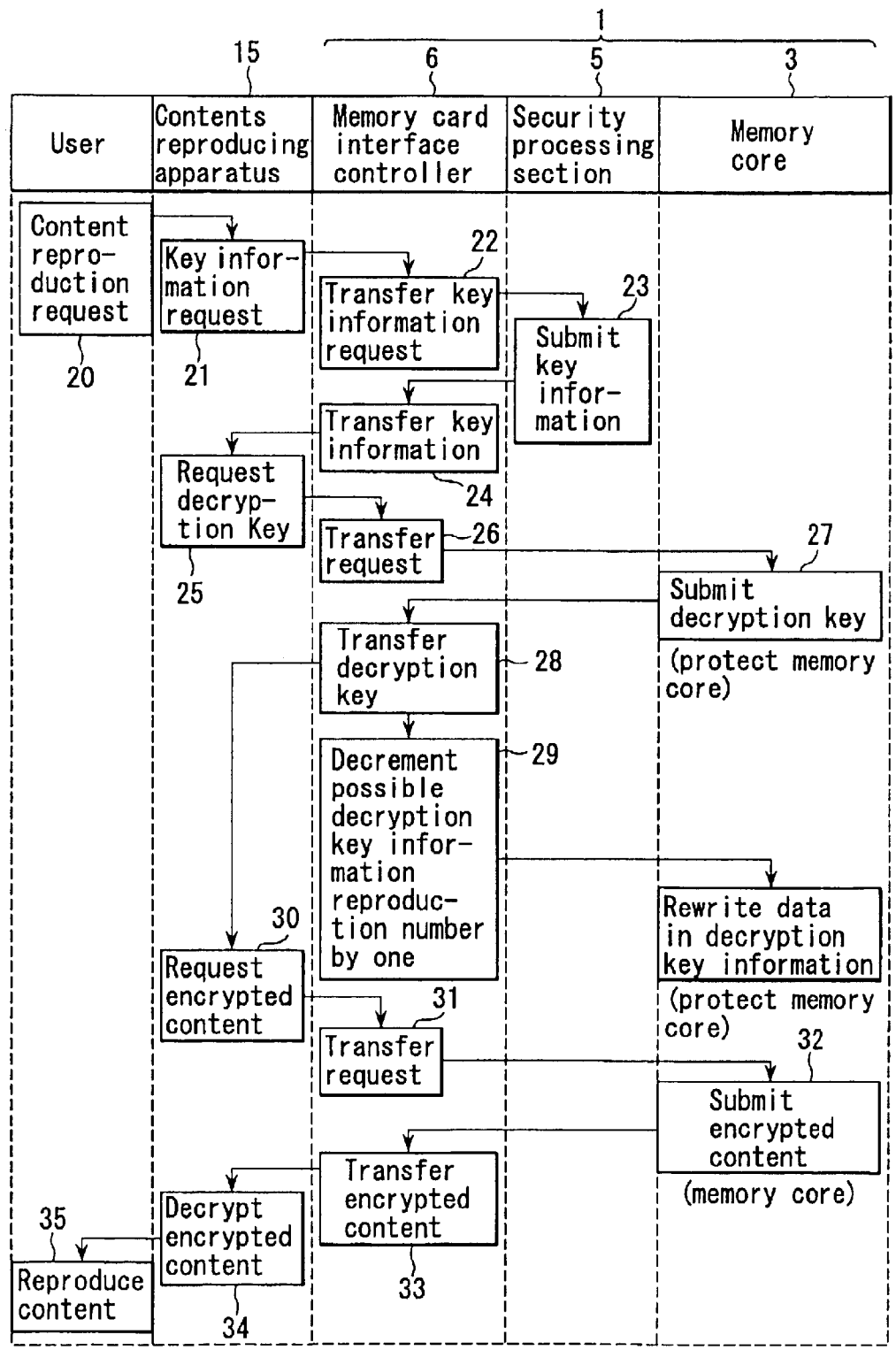
FIG. 3 is a flow chart illustrating a procedure of reading a content from an SD card according to a first embodiment of the present invention.

Now, a procedure of reading contents according to this embodiment will be described with reference to FIG. 3, a partial conceptual drawing of a contents distributing system. In FIG. 3, the elapse of time is illustrated from top to bottom. In FIG. 3, the memory card interface controller 6 and the memory core interface 7 are referred to as a whole as a memory card interface controller 6. First, a user inputs a request 20 for reproduction of a content downloaded in the memory card 1 to a contents reproducing device 15. Upon receiving this content reproduction request 20, the contents reproducing device 15 sends out a request signal 21 for key information to the memory card interface controller 6. Upon receiving this request signal 21, the memory card interface controller 6 transfers this key information request to the security processing section 5 (22). Upon receiving the key information request transferred in (22), the security processing section 5 submits corresponding key information to the memory card interface controller 6 (23). Upon receiving the key information submitted in (23), the memory card interface controller 6 transfers the key information to the contents reproducing device 15 (24).

Next, the contents reproducing device 15 requests a corresponding decryption key from the memory card interface controller 6 (25). Upon receiving the request (25) for the decryption key, the memory card interface controller 6 transfers the request to the memory core 3 (26). The memory core 3 receives the request transferred in (26), in the protect memory core area, and submits the decryption key to the memory card interface controller 6 (27).

Next, the memory card interface controller 6 transfers the description key to the contents reproducing device 15 (28). Furthermore, the memory card interface controller 6 executes a process (29) of reducing the number of times that decryption key information can be reproduced, by one.

Next, the contents reproducing device 15 requests an encrypted content from the memory card interface controller 6 (30). The memory card interface controller 6 transfers this request to the memory core 3 (31). Then, the memory core 3 submits the encrypted content to the memory card interface controller 6 (32). The memory card interface controller 6 transfers the encrypted content to the contents reproducing device 15 (33). The contents reproducing device 15 decrypts the encrypted content (34). Thus, the content is reproduced for the user (35).

Figure 4:
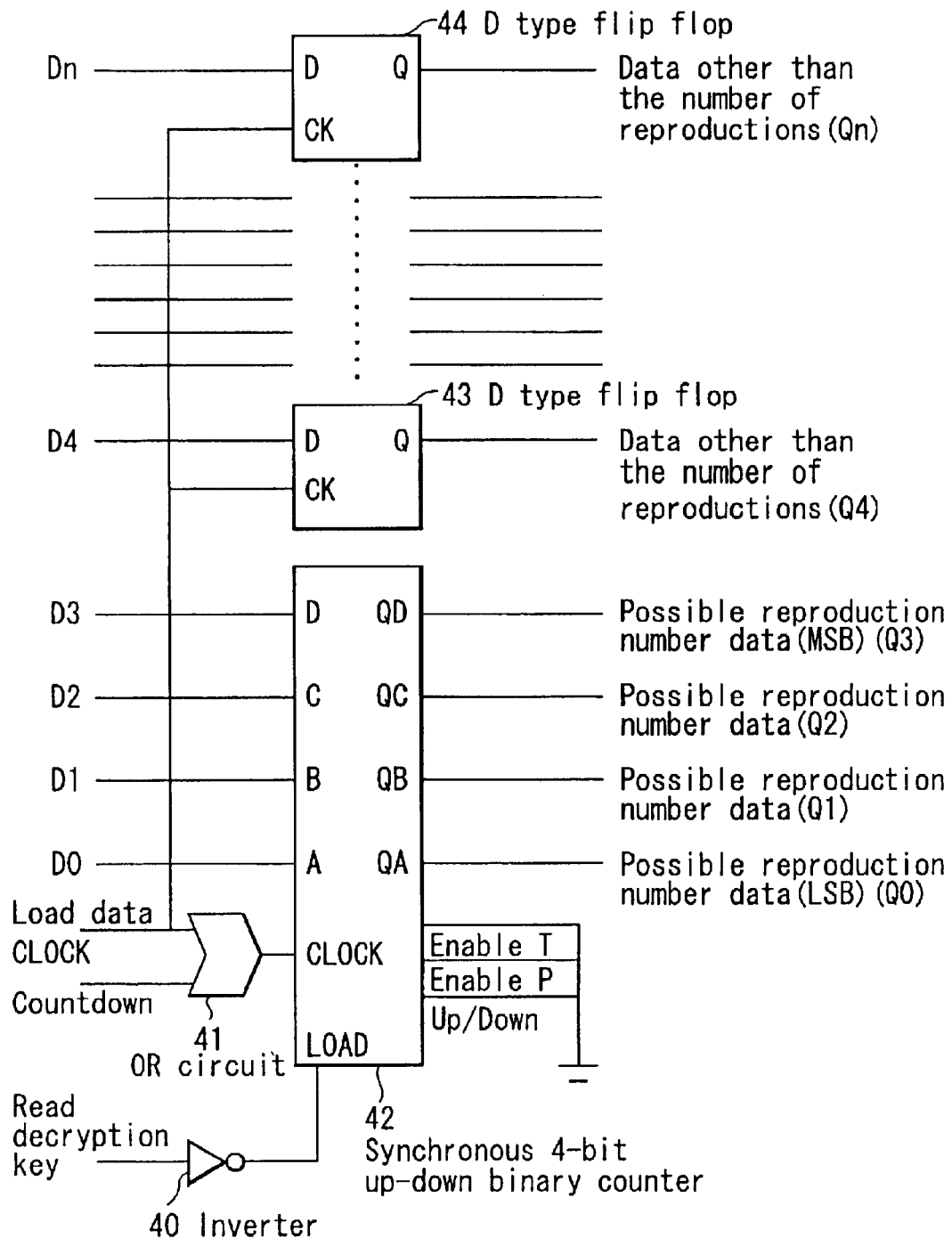
FIG. 4 is a diagram showing the configuration of a possible reproduction number countdown circuit according to the first embodiment of the present invention.

Now, the configuration of a possible reproduction number countdown circuit included in the memory core interface 7 will be described using FIG. 4. The possible reproduction number countdown circuit may be provided in the card interface controller 6. A decryption key read signal is input to an inverter 40. A countdown signal is input to one input end of an OR circuit 41, while a data load clock signal is input to the other input end of the OR circuit 41. An output signal from the inverter 40 is input to a load signal input end of a synchronous up-down 4-bit binary counter 42. Further, an output signal from the OR circuit 41 is input to a clock signal input end of the synchronous up-down 4-bit binary counter 42. Content data D0, D1, D2, and D3 are input to data input ends A, B, C, and D of the synchronous up-down 4-bit binary counter 42.

Upon receiving these input signals, the synchronous up-down 4-bit binary counter 42 outputs possible reproduction number data Q0 (LSB), Q1, Q2, and Q3 (MSB).

Further, an up-down signal and enable signals P and T are connected to ground.

A plurality of D type flip flops are provided. Content data D4 and a data load clock signal are input to a data input end and a clock input end of the first flip flop 43, respectively. The first flip flop 43 then outputs data Q4 other than the number of reproductions.

Content data Dn and a data load clock signal are input to a data input end and a clock input end of the final flip flop 44, respectively. The final flip flop 44 then outputs data Qn other than the number of reproductions.

Figure 5:
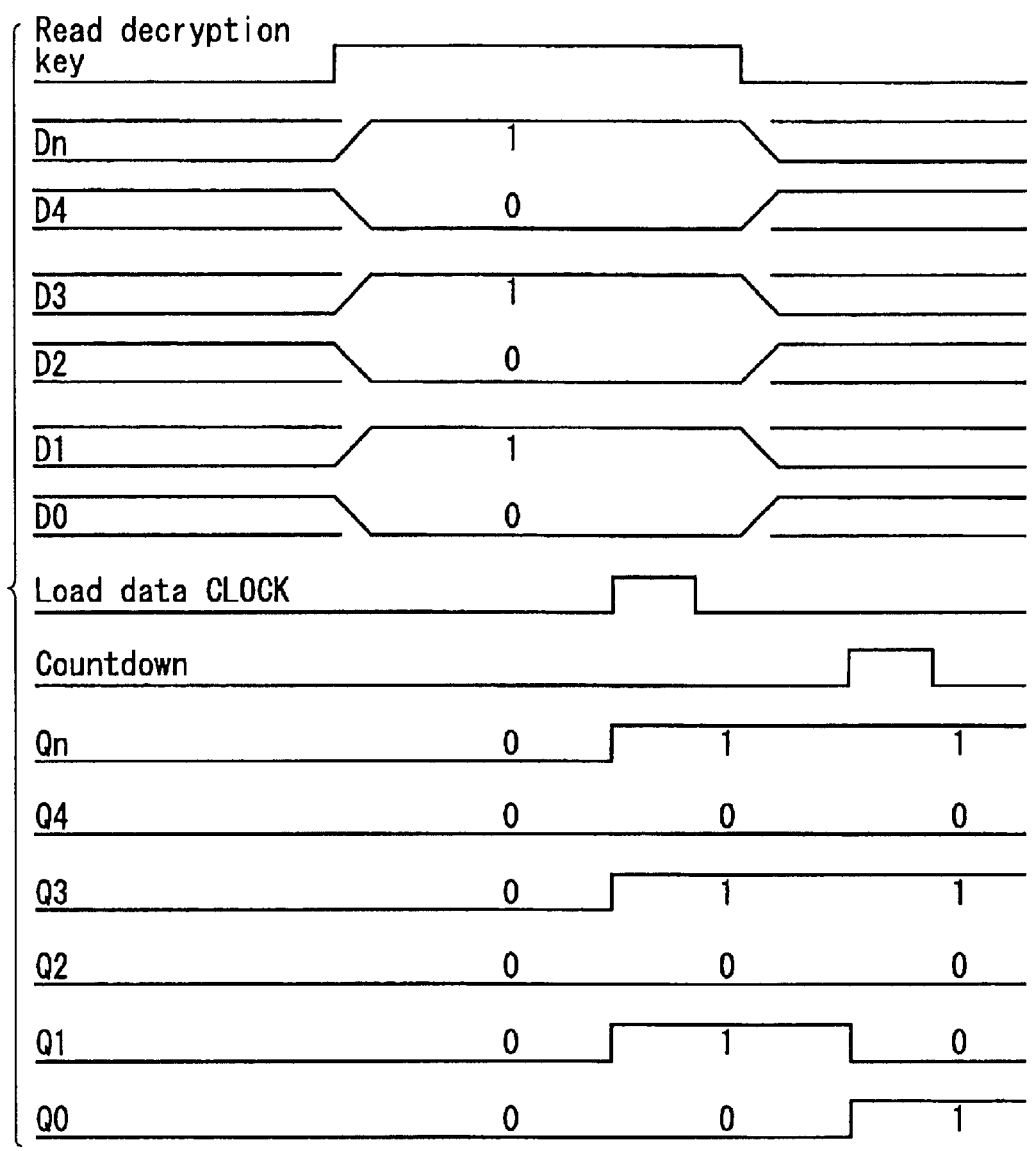
FIG. 5 is a diagram of operational waveforms in the possible reproduction number countdown circuit according to the first embodiment of the present invention.

Now, an operation of the possible reproduction number countdown circuit, shown in FIG. 4, will be described with reference to FIG. 5, a waveform diagram. It is assumed that when the decryption key read signal shifts from an "L" level to an "H" level, for example, the content data D0, D2, and D4 shift to a "0" level, whereas the content data D1, D3, and Dn shift to a "1" level and that this state is maintained while the decryption key read signal remains at the "H" level.

While the decryption key read signal is at the "H" level, a data read clock signal shifts from the "L" level to the "H" level and remains at the latter level for a fixed period of time. The possible reproduction number data Q1, Q3, and Qn all shift from the "0" level to the "1" level when the data read clock signal shifts from the "L" level to the "H" level.

After the decryption key read signal has shifted to the "L" level, a countdown signal shifts from the "L" level to the "H" level, and after a fixed period of time, returns to the "L" level. When the countdown signal shifts to the "H" level, the possible reproduction number data Q1 shifts from the "1" level to the "0" level. Further, with the same timing, the possible reproduction number data Q0 shifts from the "0" level to the "1" level. The possible reproduction number data Q2 and Q4 maintain the "0" level. Thus, the numerical outputs Q0 to Q4 of the binary counter each decrement by one.

Such a card is characterized by its very small size, light weight, high durability, simple interface, wide range of applications, powerful copyright protecting function, high-speed data transfer, and the like. Even if the memory card main body is provided with a counter, a reduction in the size of the memory card can be facilitated because the counter is smaller in size.

(Second Embodiment)

The memory card of this embodiment is configured as shown in FIG. 1 as in the first embodiment.

The interface 2 receives input contents from external equipment and outputs contents to it. The interface driver 4 drives the interface 2. Furthermore, the card interface controller 6 includes a counter which receives input signals from the interface driver 4 and outputs signals to the interface driver 4. The security processing section 5 is controlled by the card interface controller 6 to supply a decryption key to the card interface controller 6 upon a request for reproduction of a content. The memory core interface 7 is controlled by the security processing section 5 and the card interface controller 6 to count, in response to a content reproduction request, the amount of reproductions to calculate the amount of possible reproductions.

The memory core interface 7 writes, reads, and deletes contents to and from memory core 3. The memory core 3 records the amount of possible reproductions for a content if a request for reproduction of this content is input to the memory core. The memory core 3 outputs the corresponding encrypted content to the memory core interface 7 if the reproduction request does not cause the amount of possible reproductions to be exceeded.

Further, to realize a security function, the memory core 3 has a protect area which is separate from a normally accessible user data area and which is only accessible to systems for which accesses are permitted through mutual authentication, as well as key information used for the mutual authentication. If a music content is downloaded into the memory card, the encrypted content is recorded in the user data area. Key information and copy control information used to encrypt this content are saved in the protect area after mutual authentication. The information saved in the protect area can only be copied to those regular systems which are accepted through mutual authentication.

Figure 6:
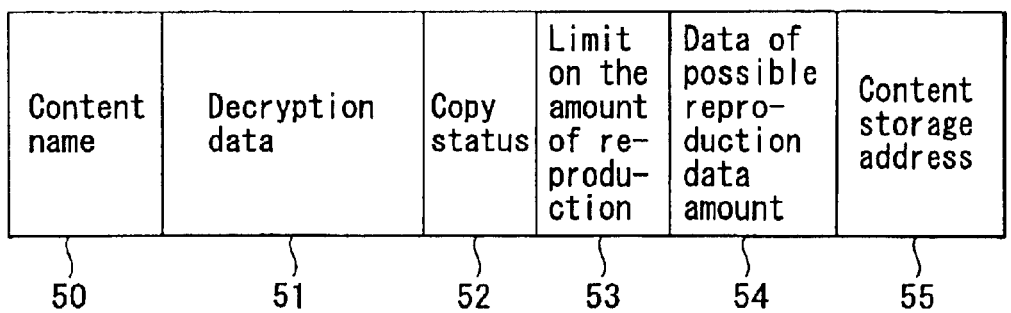
FIG. 6 is a conceptual drawing illustrating the contents of a decryption key according to the second embodiment of the present invention.

Now, the decryption key according to this embodiment will be described with reference to FIG. 6. The decryption key is recorded in the memory core 3, and data on the decryption key is updated upon reproduction and copying. A content name 50 specifying a content is recorded as a part of the decryption key data. Furthermore, decryption data 51 is recorded as a part of the decryption key data. Moreover, copy status data 52 is recorded as a part of the decryption key data. The copy status data 52 is recorded are "1" if, for example, the content specified by the content name has already been copied to another SD card. In this case, this SD card is set so that this content cannot be reproduced. This is to prevent unlimited illegal copying. On the other hand, "0" is recorded if the content has not been copied to any other SD cards. Thus, this SD card is so set that this content can be reproduced providing that the other conditions are met.

Furthermore, reproduction amount limit data 53 is recorded as a part of the decryption key data. In this case, for example, "0" is recorded if there are no limits on the amount of reproductions. On the other hand, for example, "1" is recorded if there is any limit on the amount of reproductions. Thus, the memory card is set so that the amount of reproductions is limited.

Moreover, data 54 of possible reproduction data amount is recorded as a part of the decryption key data. If data 54 of possible reproduction data amount is recorded as "0", the memory core 3 is set so that no contents can be read from the memory core 3 even with a content reproduction request. Furthermore, a content storage address 55 is recorded as a part of the decryption key data.

Figure 7:
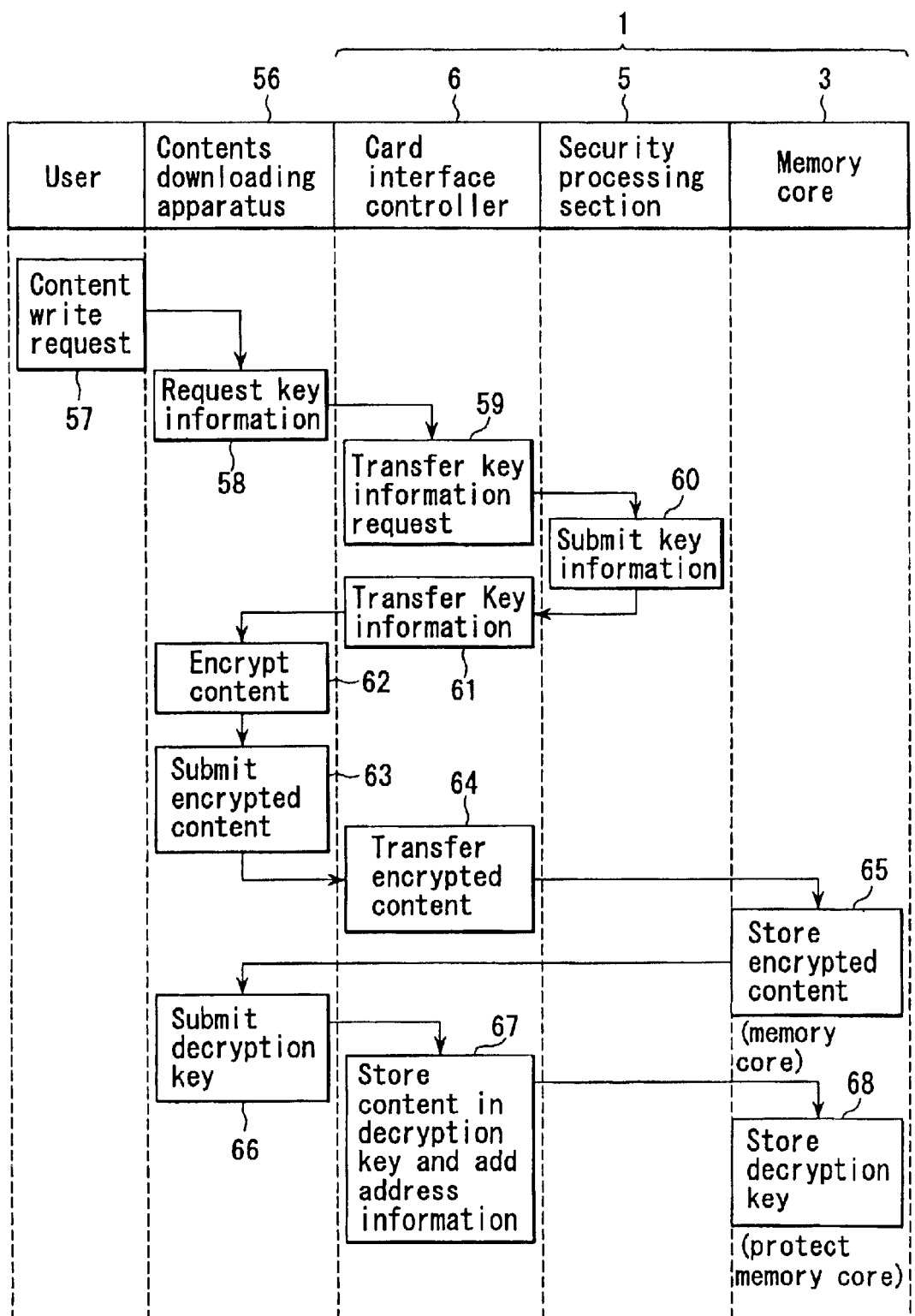
FIG. 7 is a flow chart illustrating a procedure of writing a content to an SD card according to the second embodiment of the present invention.

Now, with reference to FIG. 7, description will be given of a process procedure of writing (downloading) contents to the memory card according to this embodiment. In FIG. 7, the card interface controller 6 and the memory core interface 7 are referred to as a whole as a card interface controller 6. First, the user inputs a content write request (57) to a contents downloading device 56. Then, upon receiving the content write request (57), the contents downloading device 56 requests key information from the card interface controller 6 (58). Then, the card interface controller 6 transfers the key information request to the security processing section 5, an SD card key information storage section (59). Then, the security processing section 5 submits corresponding key information to the card interface controller 6 (60).

Next, the card interface controller 6 transfers the key information to the contents downloading device 56 (61). Then, the contents downloading device 56 encrypts a corresponding content (62). Subsequently, the contents downloading device 56 submits the encrypted content to the card interface controller 6 (63).

Next, the card interface controller 6 transfers the encrypted content to the memory core 3 (64). Then, the memory core 3 stores the encrypted content (65). Then, the contents downloading device 56 submits a corresponding decryption key to the card interface controller 6 (66). Then, the card interface controller 6 stores the content in the decryption key and adds address information to the key (67). Subsequently, the memory core 3 stores the decryption key (68).

Figure 8:
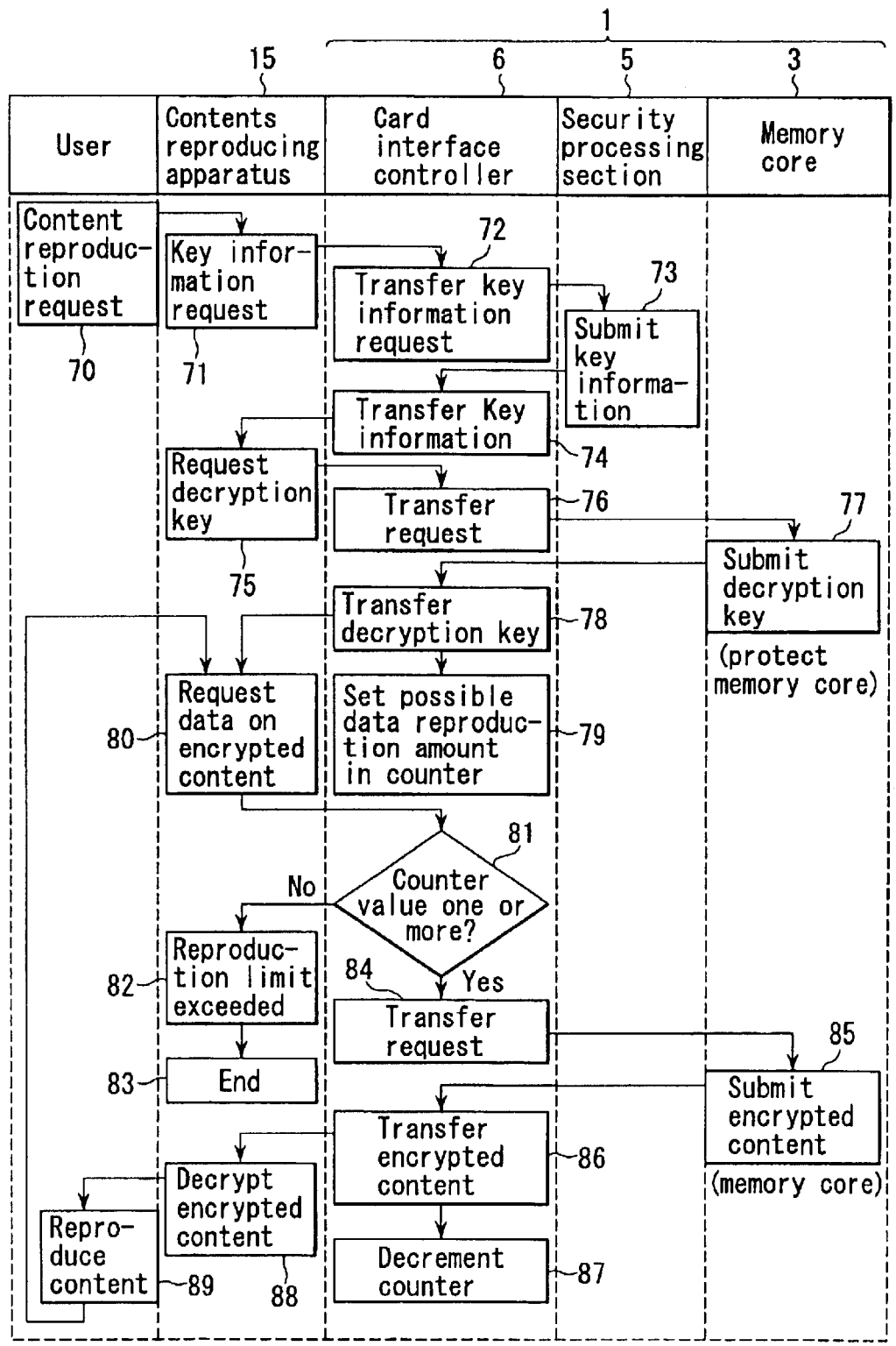
FIG. 8 is a flow chart illustrating a procedure of reading a content from the SD card according to the second embodiment of the present invention.

Now, with reference to FIG. 8, description will be given of a procedure of reading contents from an SD card according to this embodiment. In FIG. 8, the card interface controller 6 and the memory core interface 7 are referred to as a whole as a card interface controller 6. First, the user provides a content reproduction request (70) to the contents reproducing device 15. Upon receiving this content reproduction request (70), the contents reproducing device 15 requests key information from the card interface controller 6 (58). Then, the card interface controller 6 transfers this key information request to the security processing section 5 (72). Then, the security processing section 5 submits corresponding key information to the card interface controller 6 (73). Then, the card interface controller 6 transfers the key information to the contents reproducing device 15 (74). The contents reproducing device 15 requests a corresponding decryption key from the card interface controller 6 (75). Then, the card interface controller 6 transfers the request to the memory core 3 (76). The memory core 3 submits the decryption key stored in the protect memory core, to the card interface controller 6 (77).

Next, the card interface controller 6 transfers the description key to the contents reproducing device 15 (78) and sets the amount of possible data reproduction in the counter.

Then, the contents reproducing device 15 requests data on an encrypted content from the card interface controller 6 (80). The card interface controller 6 determines whether or not the counter value is one or more (81).

If the card interface controller 6 determines in (81) that the counter value is less than one, the contents reproducing device 15 informs that the limit on reproduction is exceeded (82). The process is then ended (83). If the card interface controller 6 determines in (81) that the counter value is one or more, it transfers the request to the memory core 3 (84).

The memory core 3 then submits the encrypted content to the card interface controller 6 (85). The card interface controller 6 transfers the encrypted content to the contents reproducing device 15 (86) and decrements the counter (87).

Then, the contents reproducing device 15 decrypts the encrypted content (88), and the content is reproduced for the user (89). Then, data on the encrypted content is requested from the contents reproducing device 15 (80).

Thus, to read a content from the memory card, the key used for encryption is read from the protect area and then used to decrypt the content stored in the user data area. Data on a limit on the amount of content used is loaded into the decryption key data.

That is, first, the SD card stores encrypted data, decryption key data used to decrypt the encrypted data, and count data accompanying the decryption key data and indicating the counted amount of data reproduction remaining. The encrypted data contains, for each of the contents, a file name and a pair of decryption key data and count data on the amount of data reproduction remaining. That is, the SD card stores as many these sets of data as the contents. The encrypted data, decryption key, and remaining data reproduction amount are stored in the flash memory.

In this manner, data from the content is sequentially transmitted to the reproducing device, while the counter value is decremented by one. A countdown clock is a signal generated synchronously with transfer of data on an encrypted content and thus generates as many pulses as data outputs.

Thus, when the counter value becomes "0", a message is transmitted to the reproducing device, indicating that the limit on reproduction has been exceeded. Then, a request for content data is no longer output to the memory core. Consequently, the reproduction of the content is ended.

The user then enjoys another content. In this case, the counter value (i.e. "0") for the last content is written to the possible data reproduction amount section of the last content decryption key.

At this time, the data on the decryption key is deleted before the counter value is written.

Thus, the remaining data reproduction amount count data is written to the nonvolatile memory. This prevents the data from being deleted even if the reproducing equipment is powered off.

Then, reproduction of a new content is started using a procedure starting with the request (70) for the new content.

By writing the counter value to the possible data reproduction amount section of the decryption key every fixed time, the counter value can be stored in the nonvolatile memory even if the power is inadvertently turned off. Therefore, the data can be prevented from being lost.

Further, it is assumed that while enjoying a content, the user attempts to switch to another content. Then, once the user selects the data address of the new content, it is determined that this address is different from the stored address of the content being enjoyed. Then, the counter value of the current content is written to the possible data reproduction amount section of the content decryption key to end the current content. Subsequently, reproduction of the new selected content is started by executing a procedure on this content which procedure starts with a request for reproduction.

If an unencrypted content is recorded in the memory card, no decryption keys are transmitted to the external equipment but only the content data is transmitted to it. Accordingly, this content is reproduced as reproduced data without being decrypted.

Figure 9:
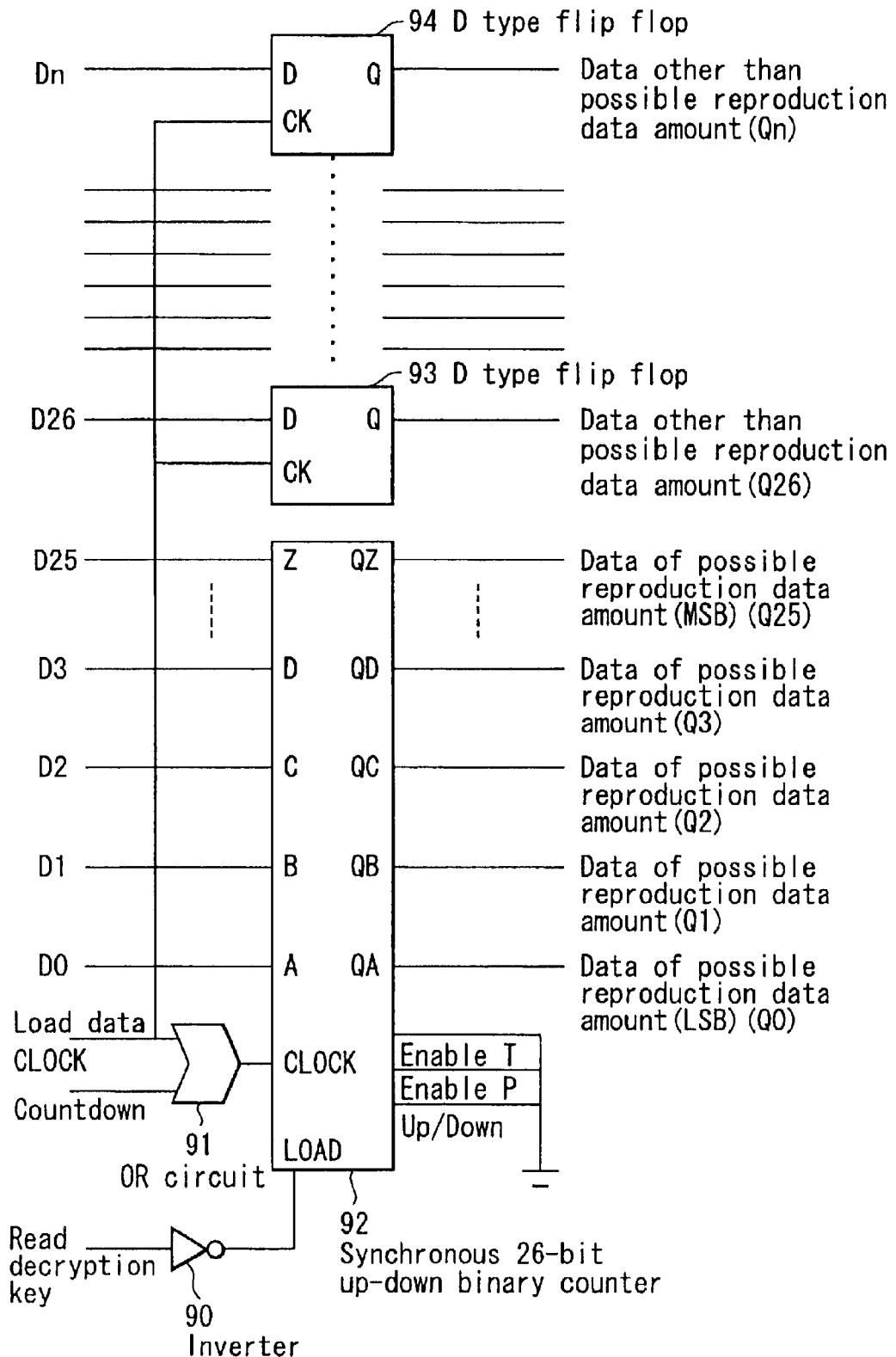
FIG. 9 is a diagram showing the configuration of a possible reproduction number countdown circuit according to the second embodiment of the present invention.

Now, the configuration of a possible reproduction number countdown circuit included in the memory core interface 7 will be shown using FIG. 9. The possible reproduction number countdown circuit may be provided in the card interface controller 6. A decryption key read signal is input to an inverter 90. A countdown signal is input to one input end of an OR circuit 91, while a data load clock signal is input to the other input end of the OR circuit 91. An output signal from the inverter 90 is input to a load signal input end of a synchronous up-down 26-bit binary counter 92. Further, an output signal from the OR circuit 91 is input to a clock signal input end of the synchronous up-down 26-bit binary counter 92. Content data D0, D1, D2, D3, . . . , D25 are input to data input ends A, B, C, D, . . . , Z of the synchronous up-down 26-bit binary counter 92.

Upon receiving these input signals, the synchronous up-down 26-bit binary counter 92 outputs data (LSB) Q0, Q1, Q2, Q3, . . . , (MSB) Q25 of possible reproduction data amount.

Further, an up-down signal and enable signals P and T are connected to ground.

A plurality of D type flip flops are provided. Content data D26 and a data load clock signal are input to the data input end and the clock input end of the first flip flop 93, respectively. The first flip flop 93 then outputs data Q26 other than a possible reproduction data amount.

Content data Dn and a data load clock signal are input to a data input end and a clock input end of the final flip flop 94, respectively. The final flip flop 94 then outputs data Qn other than the possible reproduction data amount.

Figure 10:
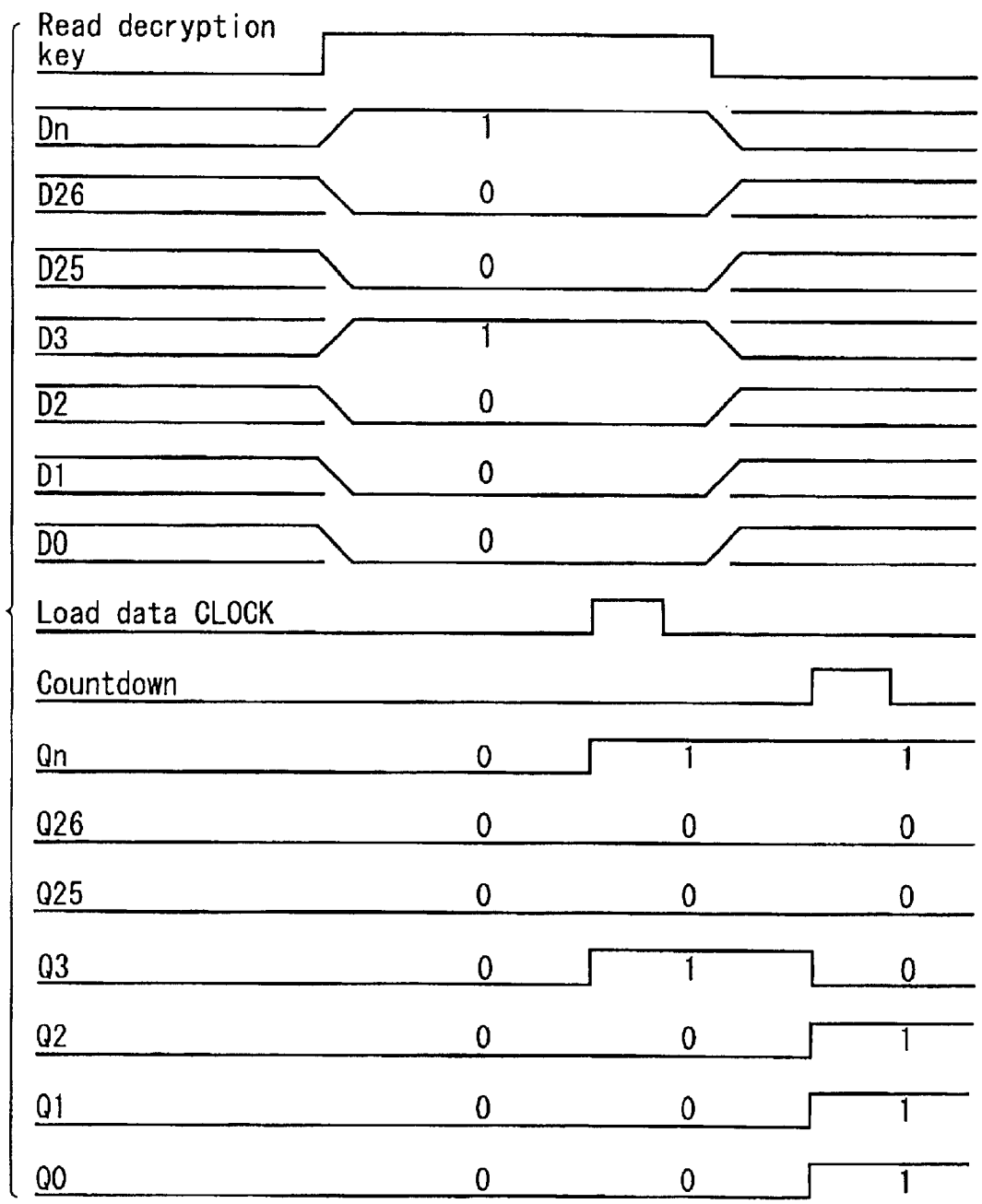
FIG. 10 is a diagram of operational waveforms in the possible reproduction number countdown circuit according to the second embodiment of the present invention.

Now, an operation of the possible reproduction data amount countdown circuit, shown in FIG. 9, will be described with reference to FIG. 10, a waveform diagram. It is assumed that when the decryption key read signal shifts from the "L" level to the "H" level, for example, the content data D0, D1, D2, D25, and D26 shift to the "0" level, whereas the content data D3 and Dn shift to the "1" level and that this state is maintained while the decryption key read signal remains at the "H" level.

While the decryption key read signal is at the "H" level, a data read clock signal shifts from the "L" level to the "H" level and remains at the latter level for a fixed period of time. Data Q3 and Qn all shift from the "0" level to the "1" level when the data read clock signal shifts from the "L" level to the "H" level.

After the decryption key read signal has shifted to the "L" level, a countdown signal shifts from the "L" level to the "H" level, and after a fixed period of time, returns to the "L" level. When the countdown signal shifts to the "H" level, data Q3 of the possible reproduction data amount shifts from the "1" level to the "0" level. Further, with the same timing, data Q0, Q1, and Q2 of the possible reproduction data amount shift from the "0" level to the "1" level. Data Q25 and Q26 maintain the "0" level. In this scheme, the numerical outputs Q0 to Q24 of the binary counter are each decremented by one.

Figure 11:
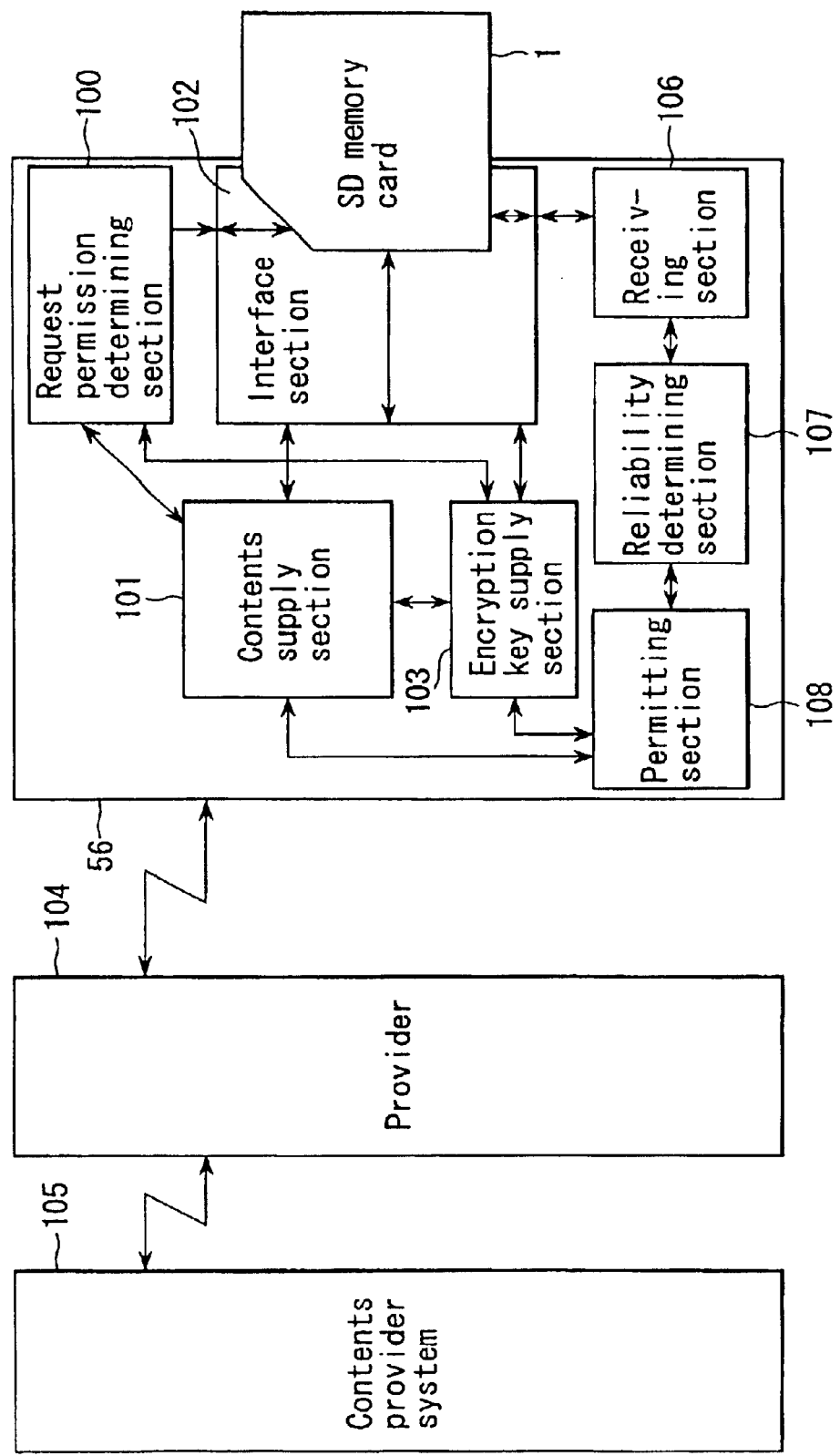
FIG. 11 is a diagram of the configuration of an example of a contents distributing system according to the second embodiment of the present invention.

Now, the conceptual configuration of a contents distributing system according to this embodiment will be described with reference to FIG. 11.

The contents downloading device 56 has a request permission determining section 100 that receives a content supply request from the user to determine whether or not to permit this request.

A contents supply section 101 receives, via an interface section 102, the result of the determination made by the request permission determining section 100. If the result of the determination is affirmative, the contents supply section 101 supplies a corresponding content to the memory card 1. If the result of the determination is negative, the contents supply section 101 does not supply any contents.

An encryption key supply section 103 receives the result of the determination made by the request permission determining section 100. If the result of the determination is affirmative, the encryption key supply section 103 supplies the memory card 1 with a corresponding content-decrypting encryption key with possible reproduction amount data. The content may be stored in the contents downloading device 56 or transmitted by a contents provider system 105 through a provider 104 via a communication line or the like.

Further, the downloading device 56 may be provided with a section 106 that receives a contents price pay method specification signal from the user, and a reliability determining section 107 that determines whether or not the received particular pay method is reliable. The downloading device 56 may further be provided with a permitting section 108 that allows the contents supply section 101 and the encryption key supply section 103 to perform the respective supply operations if the reliability determining section 107 determines that the pay method is reliable. In this case, the reliability determining section 107 may alternatively be provided in the provider 104 or contents provider system 105 to transmit and receive data to and from the downloading device 56 via the communication line.

Alternatively, the system described below may be used. That is, contents are not sequentially downloaded but are recorded in the memory card before reproduction. Then, if the user desires to reproduce a content, the request permission determining section 100 receives a request for supply of a corresponding content-decrypting encryption key from the user to determine whether or not to permit this request. The contents distributing system may also be configured so that upon receiving the result of the determination made by the request permission determining section 100, the encryption key supply section 103 supplies a corresponding content-decrypting encryption key with possible reproduction amount data if the result of the determination is affirmative. In this case, the contents supply section 101 is not required. Even if any content has been downloaded in the memory card, it cannot be reproduced without the relevant encryption key. Accordingly, no security problems occur.

Figure 12:
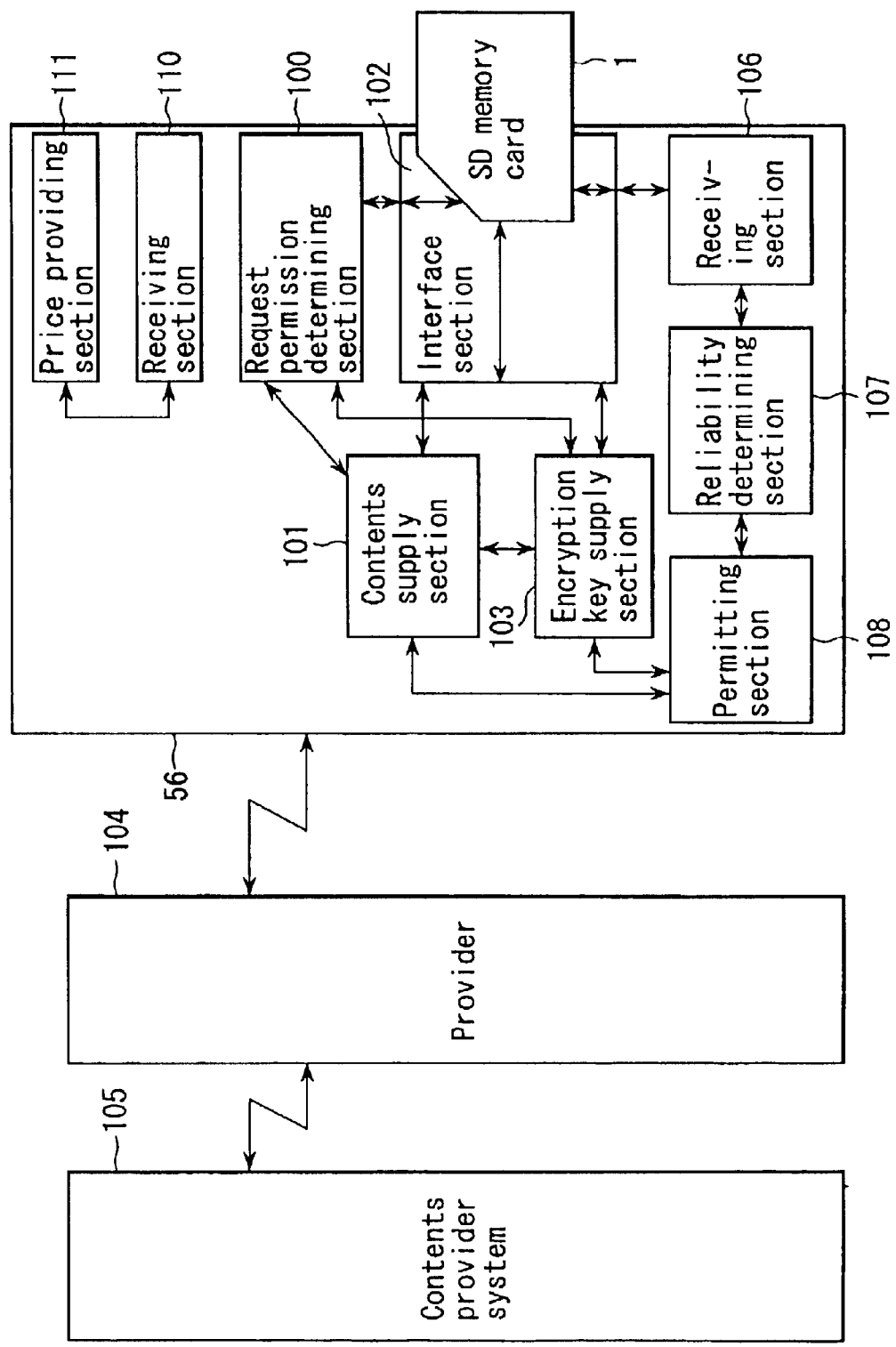
FIG. 12 is a diagram of the configuration of another example of a contents distributing system according to the second embodiment of the present invention.

Further, the contents distributing system of this embodiment may be configured as shown in FIG. 12. A section 110 that receives a content specification request and a possible reproduction amount request is provided to receive a specification request and possible reproduction amount request for a content downloaded by the user. On the basis of the received requests, a price providing section 111 provides a supply price to the user depending on the specified content and possible reproduction amount already recorded in the downloading device 15. Subsequently, the contents downloading section 101 receives a download confirmation instruction from the user to allow the specified content to be downloaded into the memory card 1. The encryption key supply section 103 downloads a corresponding decryption key with the specified possible reproduction amount data.

Even with this system, if the content has already been downloaded into the memory card, only the decryption key is downloaded into the memory card.

Further, the price of downloading for the user may be displayed by selecting one of the values recorded as fixed prices. Alternatively, a charge calculating section may be provided in the provider 104 or contents provider system 105 to operate via the communication line so that the price can be varied and displayed on the basis of elapsed download time requested by a plurality of users, the amount of contents requested by them per unit time, the time elapsed from the start of release of a content, or the like. This maximizes the benefits of copyrighters and contents providers and enables the user to receive the supply of contents at the optimum prices on the basis of balanced supply and demand. Of course, the displayed prices may be changed daily or weekly.

Further, a pay method receiving section (not shown) may be provided in the downloading device 56 to receive a content price pay method specification signal from the user. In this case, a reliability determining section (not shown) is further provided in the downloading device 56 to determine whether or not the particular received pay method is reliable. The encryption key supply section 103 is allowed to operate if the reliability determining section determines that the pay method is reliable. This arrangement allows the user's solvency to be appropriately determined before downloading. The reliability determining section may be provided in the provider 104 or contents provider system 105 connected to the contents distributing system via the communication line so that the user's credit information can be transmitted to and received from each other.

Figure 13:
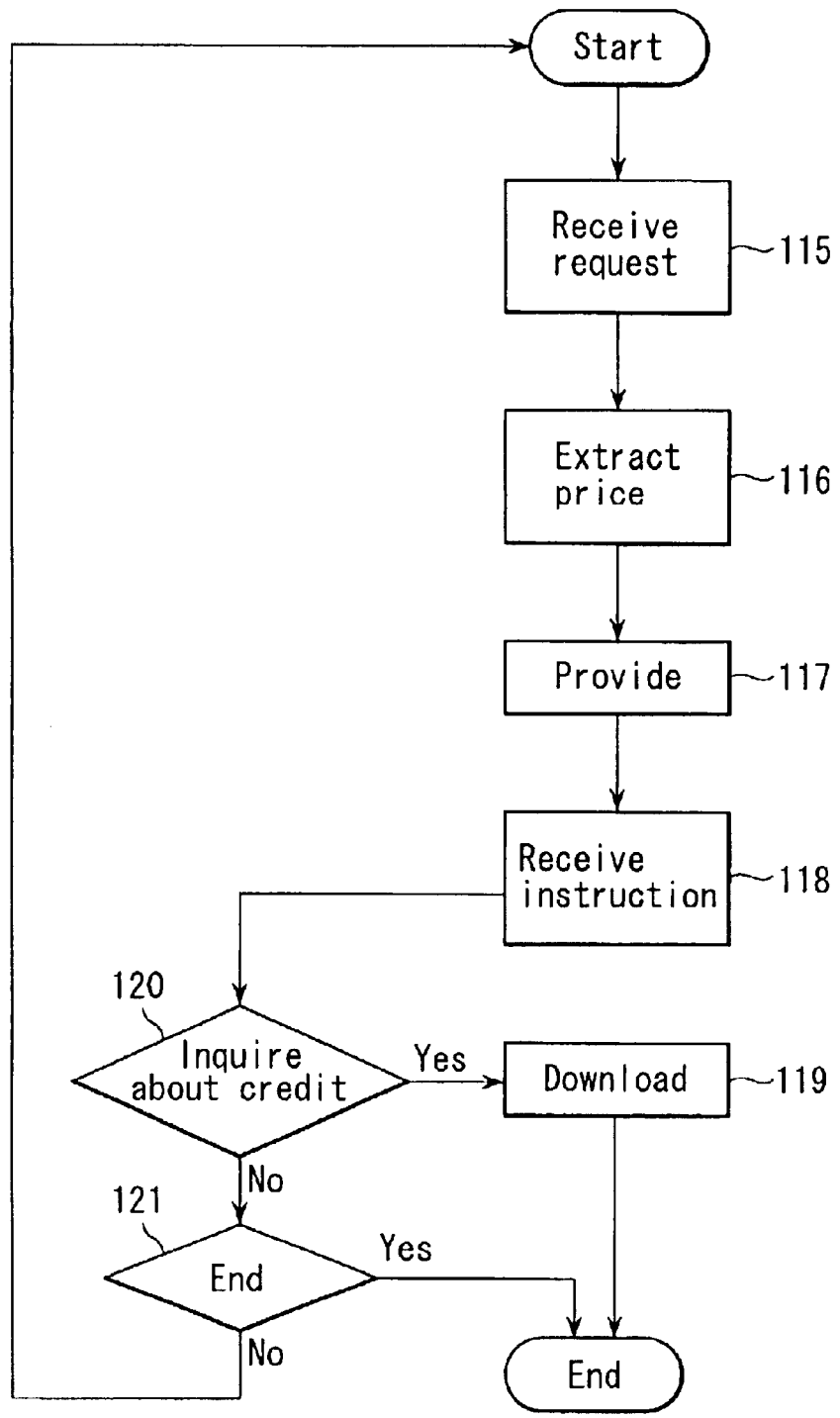
FIG. 13 is a flow chart illustrating a contents distributing method according to the second embodiment of the present invention.

Now, a contents distributing method will be described with reference to FIG. 13. First, at a request receiving step 115, the downloading device receives a specification request and possible reproduction amount request for a content downloaded by the user.

Then, at a price extracting step 116, the supply price dependent on the specified content and possible reproduction amount is retrieved from a database or calculated on the basis of an equation. That is, the contents provider uses the downloading device to set a content charge for each content the downloading of which is requested by the user, depending on the user's desired number of possible reproductions. The contents provider further prompts the user to select a method of paying the sum of a line use charge and a line connection charge.

Then, at a providing step 117, the extracted price is provided to the user.

Then, at an instruction receiving step 118, a download confirmation instruction is received from the user.

Subsequently, at a downloading step 119, the content and the corresponding decryption key with the specified possible reproduction amount are downloaded into the memory card. In this case, if the content has already been downloaded into the memory card, only the decryption key is downloaded into the memory card.

Further, a credit inquiring step 120 may be provided between the instruction receiving step 118 and the downloading step 119. In this case, any settlement condition is checked, for example, the user is authenticated, a payment contract is signed, payment or the user's payment account is checked, the user's credit is inquired about to check whether or not the charge can be paid from the user's credit card, or it is checked whether or not the charge has successfully been paid from a prepaid card. Then, if the credit is successfully confirmed, the contents provider can provide the content to the user. In this case, if the credit cannot be confirmed, the process is ended or returns to the beginning. Alternatively, a downloading-exclusive machine may download an exclusive content into the memory card, and then any means may be used to establish means for paying the charge. Subsequently, the downloading-exclusive machine may provide the memory card to the user.

Alternatively, permission may be given to download contents into the memory card free of charge. In this case, it may be useful for the contents provider to limit the number of reproductions rather than permitting reproductions unlimitedly. Thus, this embodiment is effective in such a situation. That is, this embodiment is particularly effective if the user is provided with a sample with a minimum number of possible content reproductions available, and if he or she is pleased with the sample contents, downloads them as usual by paying the corresponding price.

In the above description, the SD card has been described. However, this technique is applicable to magic gate memory sticks, "Secure Multi Media Cards", and others which have a security function with a copy protection function because they have security circuit sections of similar structures. That is, this embodiment is applicable to any recording media having a function of protecting the security of the contents recorded in the memory card.

In this regard, the contents according to this embodiment are not limited to music contents or books. With an increased memory capacity, they are applicable to moving pictures, videos, and the like. That is, this embodiment is applicable as means for recording newspapers, magazines, comics, movies, game software, or the like to replace recording media such as paper media, video cassettes, and DVDs. Further, the downloaded contents may be music data recorded on CDs or digital books recorded on DVD-ROMs or MDs.

Furthermore, the equipment used for downloading may be a personal computer, a portable digital assistant (PDA), a high-performance cellular telephone, or a terminal installed at a convenience store. The contents provider distributes information to such equipment using a telephone line, a communication satellite, a high-speed data cable, or the like. Further, the equipment used for reproduction may be a digital audio signal reproducing apparatus using a removable memory card and which constitutes an audio system together with an amplifier apparatus, speakers, a CD player, an MD player, a tuner, and others. Of course, this embodiment is applicable to audio apparatuses of a portable reproducing apparatus type.

Thus, this embodiment provides a memory card having a function of performing an operation of counting the amount of data reproduced and recording the amount of reproduction remaining, inside the memory card without the help of external equipment, and inhibiting automatic reproductions if the predetermined amount of reproduction has been exceeded. That is, this embodiment provides a memory card having a function of registering the amount of data reproduced as a part of the decryption key and counting the amount of data reproduced before the user enjoys a content so as to inhibit reproduction if the initial registered amount has been exceeded.

Further, the contents can be counted on the basis of the amount of data reproduced, allowing construction of a system compatible with the mechanism of sale of contents. That is, provision of the memory card of this embodiment enables a recording medium to be reused a number of times to record, reproduce, and delete contents. Accordingly, the price of the recording medium itself can be shared by a plurality of contents to reduce the distribution prices of the contents. Furthermore, the spread of the memory card reduces the manufacture costs of the memory card main body and allows contents to be downloaded before a free memory card with a limit on the amount of data reproduced is distributed to the user as a sample.

Moreover, since the counting operation is performed inside the memory card in closed circumstances, it is difficult to cheat at the count. That is, the contents reproduction amount or the contents reproduction number is counted inside the memory card, so that the counting mechanism is finer than those of external processing devices. Consequently, it is very difficult to disassemble and regulate the memory card so as to cheat at the count.

Thus, this embodiment does not only produce effects similar to those of the first embodiment but also imposes a limit on the contents reproduction amount or the contents reproduction number for which downloaded contents are reproduced. Further, this limit is reliable, so that business to inexpensively distribute contents can be realized. Furthermore, since the contents reproduction amount or the contents reproduction number is set by the user and the distributor permits the contents to be downloaded with prices based on the set reproduction time, the prices of the contents can be flexibly set depending on the user's needs.

The distributor can permit the contents to be downloaded for the user's desired reproduction amount or reproduction number and can thus charge the user depending on the amount of contents reproduced. This satisfies the user, so that the distributor is more competitive than the systems of other distributors which do not have this function.

(Variation of Second Embodiment)

In this variation, a contents provider downloads contents into the memory card before sale. When or after purchasing the memory card, the user downloads corresponding decryption keys into the memory card. The user can then reproduce the contents from the memory card while undergoing a limit on the reproduction time. If the contents are downloaded via a communication line such as the Internet, much time may be required for communication and thus downloading. On the other hand, this variation is advantageous in that the contents are downloaded in the memory card before delivery to eliminate the necessity of time for downloading. This allows the user to easily obtain the memory card into which the contents have been downloaded. The amount of data in the decryption key is much smaller than the amount of data in the contents, thus minimizing the time required for downloading.

It is not necessarily the contents provider that downloads the contents into the memory card. However, the user may use a downloading-exclusive machine with a high-speed communication line to download the contents into the memory card in a short time. Of course, this variation uses the memory card with the security function, so that even if contents are downloaded into the memory card without any decryption keys, they cannot be reproduced. Therefore, the copyrights of the contents are protected.

(Third Embodiment)

This embodiment also provides a technique of automatically deleting contents. That is, in the memory card of the first or second embodiment, after contents have been reproduced, the remaining data reproduction amount count data becomes "0" and a large number of so-called disposable contents remain in the SD card, which are unavailable in spite of the presence of encrypted data. Decryption key data and remaining data reproduction amount count data create no problems because they require only small file sizes. However, the amount of encrypted data is often enormous, and thus this data is preferably deleted once it becomes disposable.

Owing to the characteristics of the nonvolatile memory device in the memory card, if new data is to be written to the memory, it is impossible to overwrite old data with the new one. Accordingly, if old data is useless and new data (contents) is to be written in that area, the old data must be deleted before downloading. Thus, before a downloading operation is performed using the Internet, the free capacity of the memory card is checked. If the free capacity is expected to be insufficient for the contents to be downloaded, unwanted contents are preferably deleted before downloading.

If this deleting process is not executed before downloading and the contents are downloaded through the Internet or the like, then the deleting operation must be performed before the downloading operation. Consequently, the period of time increases for which the card remains connected to the Internet.

Figure 14:
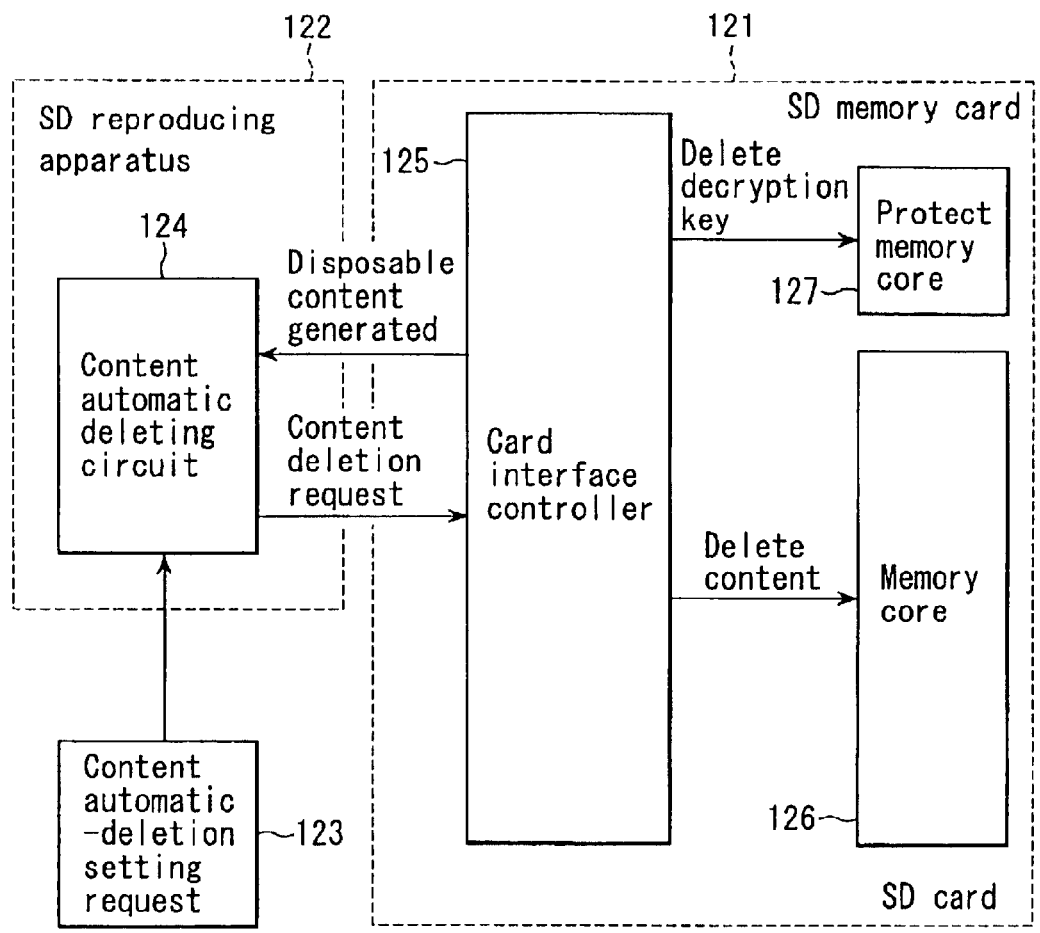
FIG. 14 is a conceptual drawing of a system that automatically deletes contents according to the third embodiment of the present invention.

Now, with reference to the conceptual drawing of a system in FIG. 14, description will be given to a system that automatically deletes disposable contents according to this embodiment. As shown in FIG. 14, an SD memory card 121 is connected to an SD card reproducing apparatus 122. In this case, the user inputs a content automatic-deletion setting request 123 to the SD card reproducing apparatus 123. In the SD card reproducing apparatus 122, a content automatic deleting circuit 124 receives the content automatic deletion setting request 123. In this case, the SD memory card 121 has a card interface controller 125, a memory core 126, and a protect memory core 127. The card interface controller 125 transmits a disposable-content generation signal to the SD memory card reproducing apparatus 122. Upon receiving this signal, the SD memory reproducing apparatus 122 transmits a content deletion request to the SD memory card 121 if it has a content automatic deletion setting.

Upon receiving this contents deletion request, the card interface controller 125 gives a memory core 126 an instruction to delete a specified content. Then, the memory core 126 executes a deleting process. Furthermore, the card interface controller 125 gives a decryption key deletion instruction to the protect memory core 127. Then, the protect memory core 127 deletes the decryption key accompanying the specified content.

Figure 15:
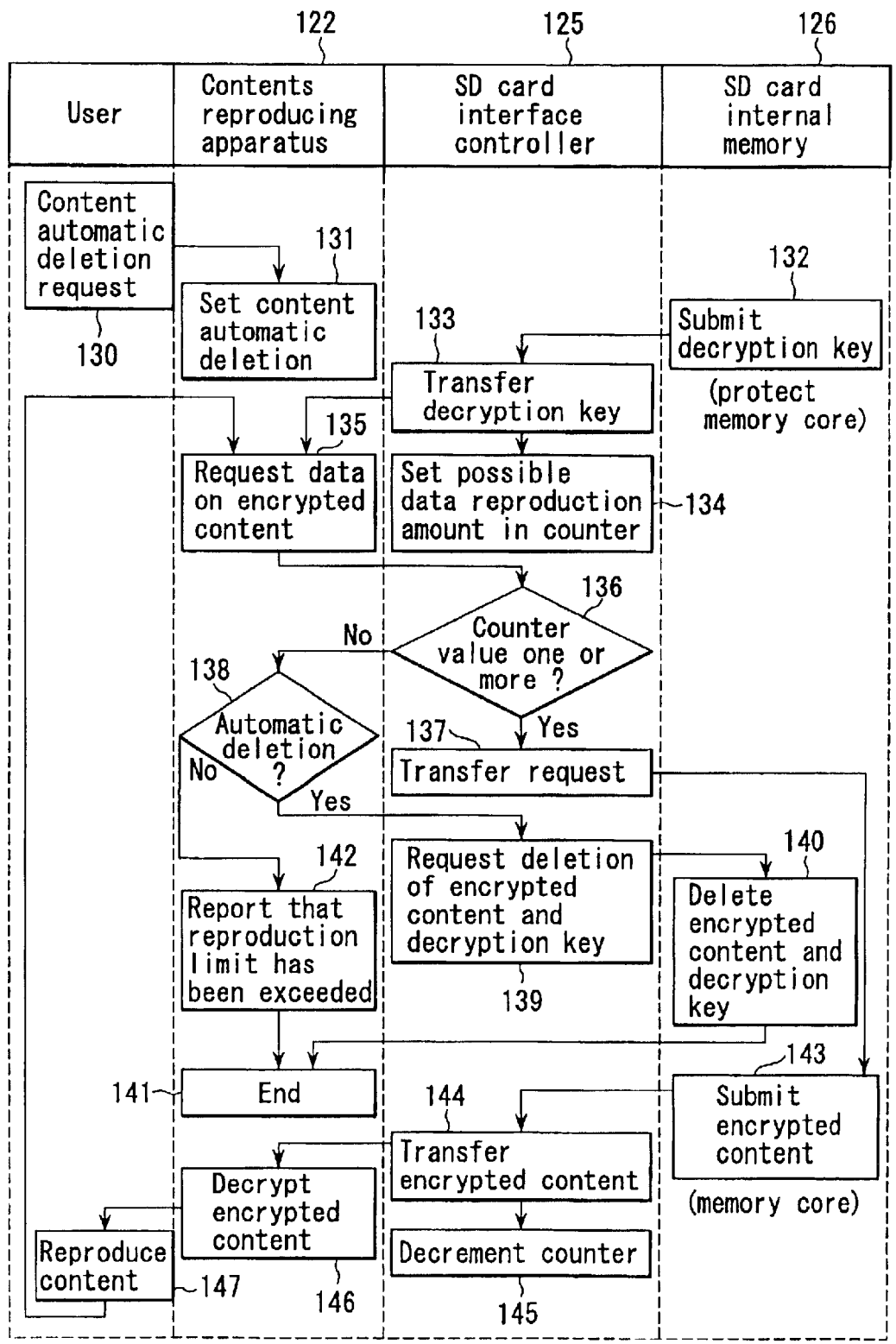
FIG. 15 is a flow chart illustrating a procedure of automatically deleting contents according to the third embodiment of the present invention.
Figure 16:
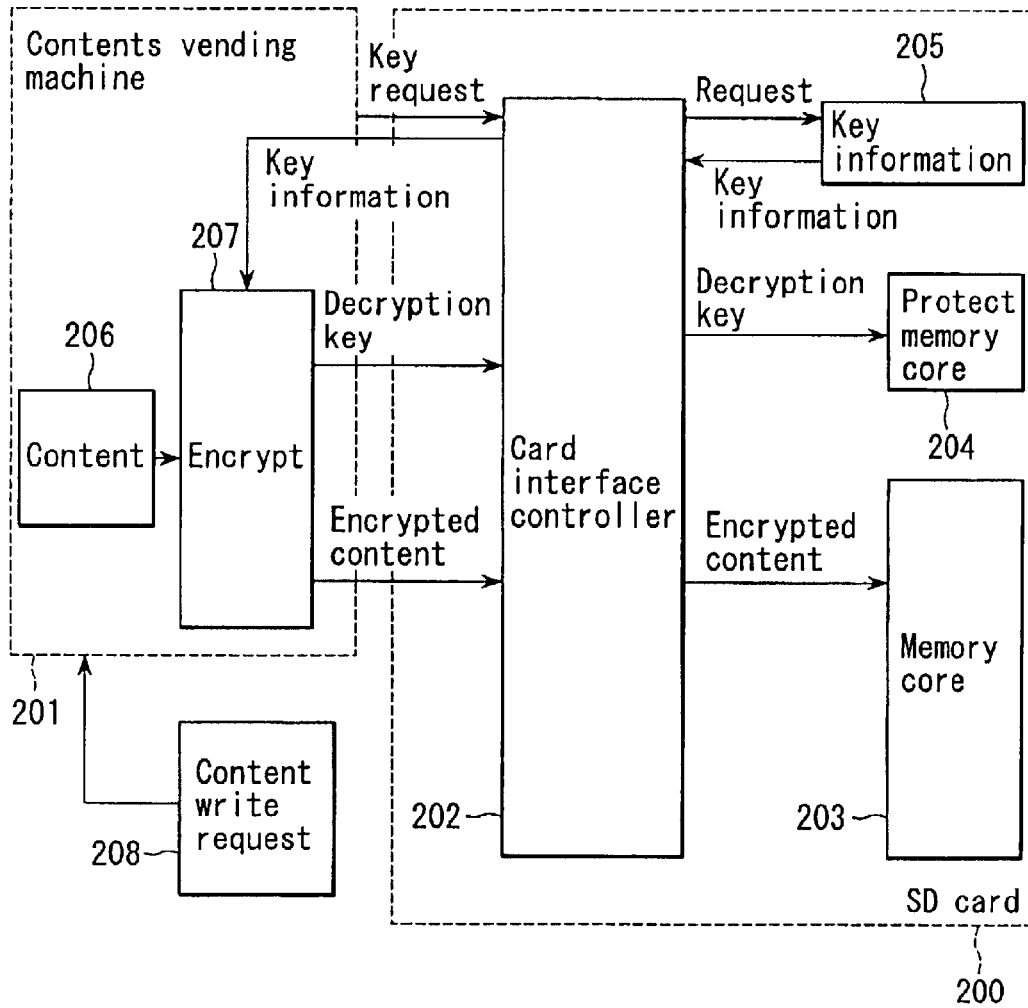
FIG. 16 is a conceptual drawing of a conventional system that writes contents to an SD memory card.
Figure 17:
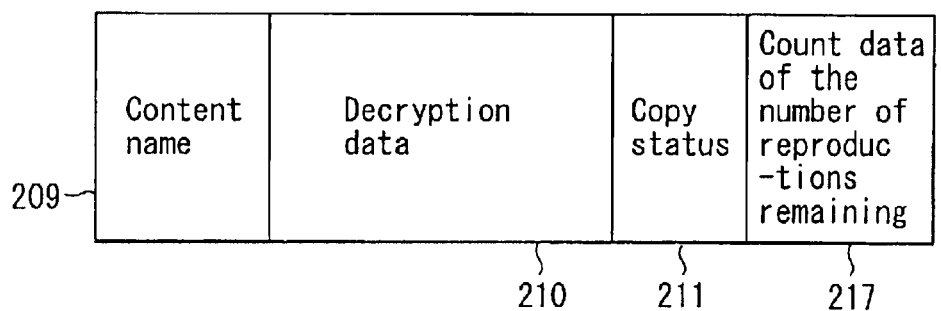
FIG. 17 is a conceptual drawing illustrating the contents of a conventional decryption key.
Figure 18:
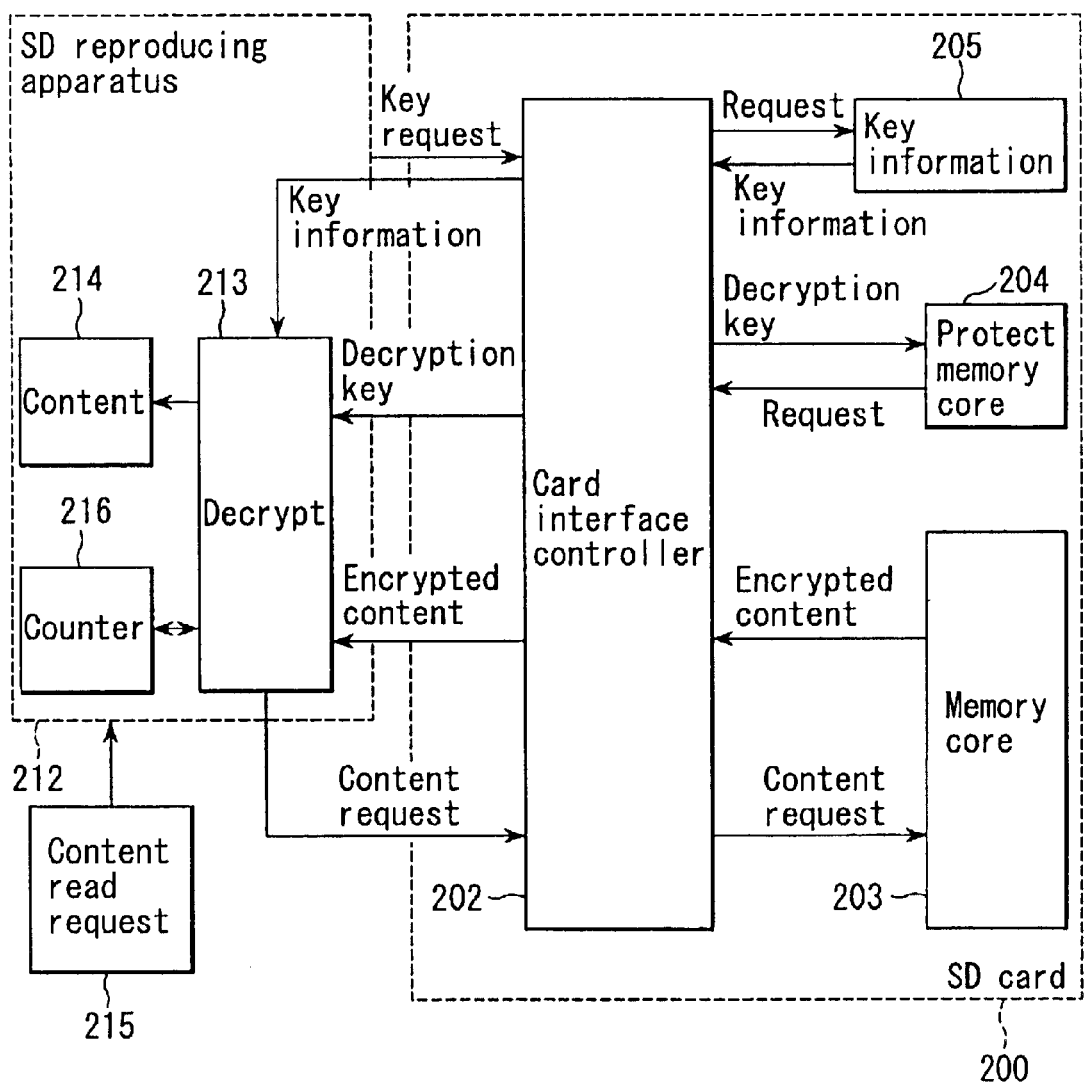
FIG. 18 is a conceptual drawing of a conventional system that reads a content from an SD memory card.

Now, with the flow chart in FIG. 15, description will be given to a procedure of automatically deleting disposable contents according to this embodiment. As shown in FIG. 15, with any timing, the user inputs a content automatic deletion request 130 to the contents reproducing apparatus 122 to provide a content automatic deletion setting 131.

When a content is reproduced, the protect memory core 127 submits a corresponding decryption key to the card interface controller 125 (132).

The card interface controller 125 transfers the decryption key to the contents reproducing apparatus 122 and sets a corresponding possible data reproduction amount in the counter (134). The contents reproducing apparatus 122 requests data on the encrypted content from the card interface controller 125. Then, the card interface controller 125 determines whether or not the counter value is one or more (136).

If the counter value is one or more, the request is transferred to the memory core 126 (137). If the counter value is less than one, the contents reproducing apparatus 122 determines whether or not to carry out automatic deletion. If automatic deletion is to be carried out, the card interface controller 125 requests the memory core 126 to delete the encrypted content and the decryption key. The memory core 126 deletes the encrypted content and the decryption key. Information on this state is transmitted to the contents reproducing apparatus 122. The contents reproducing apparatus 122 ends the process (141).

Further, if the contents reproducing apparatus 122 does not carry out automatic deletion, a reproduction limit excess report 141 is provided to end the process 141.

Then, if the counter value is one or more, the memory core 126, upon receiving the request transferred in (137) submits the encrypted content to the card interface controller 125 (143). The card interface controller 125 transfers the encrypted content to the contents reproducing apparatus 122 (144) and decrements the counter (145). The contents reproducing apparatus 122 decrypts the encrypted content (146) to reproduce the content for the user (146). Then, data on the encrypted content is requested from the contents reproducing apparatus 122 (135).

The card interface controller 125 checks the contents of the remaining data reproduction amount count data once in a while. Accordingly, if the external equipment has output a disposable-content deletion request or an automatic deletion request before the count data "0" is discovered, then unwanted content data is automatically deleted by transmitting a signal to clear the encrypted data on the corresponding content. Further, the Internet connection time can be reduced by deleting unwanted data before connection to the Internet. That is, when a reproduction request is output, the countdown controller checks the contents of the remaining data reproduction count data.

Thus, according to this embodiment, the disposable-content deletion request can be freely set considering the power status of the equipment. Consequently, when the user desires to reduce the consumption of batteries for the reproducing apparatus or to continue enjoying other contents, the user can avoid the deleting operation.

Furthermore, when disposable contents are automatically deleted when they become unwanted, the time to wait for deletion to complete is not required if a new content is stored through the Internet or the like. Thus, it is unnecessary to manually delete unwanted contents.

This also eliminates the necessity of a data clearing operation which must otherwise be performed before a new content is downloaded. Therefore, working hours are reduced.

The above embodiments may be combined together.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory card comprising:

an interface which receives an input content from external equipment and outputs a content to the external equipment;

an interface driver which drives the interface;

a card interface controller which receives an input signal form the interface driver and outputs a signal to the interface driver;

a security processing section controlled by the card interface controller to supply an encryption key to the card interface controller upon a content reproduction request;

a memory core interface controlled by the security processing section and the card interface controller and including a binary counter which counts one of the amount of content reproduced and the number of times of content reproduced, in response to a request for reproduction of a content, and a memory core to and from which a content is written, read, and deleted by the memory core interface and which records one of the amount of content reproduced and the number of times of content reproduced, if a request for reproduction of a content is input to the memory core, the memory core outputting the encrypted content to the memory core interface if the reproduction request does not cause one of the amount of possible content reproduction and the number of times of possible content reproduction to be exceeded.

2. A memory card according to claim 1, wherein the binary counter of the memory core interface counts the amount of content reproduced, in response to a request for reproduction of a content, and the memory core outputs the encrypted content to the memory core interface if the reproduction request does not cause the amount of possible content reproduction to be exceeded if a request for reproduction of a content is input to the memory core.

3. A memory card according to claim 1, wherein the binary counter of the memory core interface counts the number of times of content reproduced, in response to a request for reproduction of a content, and the memory core outputs the encrypted content to the memory core interface if the reproduction request does not cause the number of times of possible content reproduction to be exceeded if a request for reproduction of a content is input to the memory core.

4. A memory card comprising:

an interface which receives an input content from external equipment and outputs a content to the external equipment and which receives an input content automatic deletion signal;

an interface driver which drives the interface;

a card interface controller which receives an input signal form the interface driver and outputs a signal to the interface driver;

a security processing section controlled by the card interface controller to supply an encryption key to the card interface controller upon a content reproduction request;

a memory core interface controlled by the security processing section and the card interface controller and including a binary counter which counts one of the amount of content reproduced and the number of times of content reproduced, in response to a request for reproduction of a content, the memory core interface outputting a request for deletion of an encrypted content and an encryption key if the content automatic deletion request is input to the memory core interface, and a memory core to and from which a content is written, read, and deleted by the memory core interface and which records one of the amount of content reproduced and the number of times of content reproduced, if a request for reproduction of a content is input to the memory core, the memory core outputting the encrypted content to the memory core interface if the reproduction request does not cause one of the amount of possible content reproduction and the number of times of possible content reproduction to be exceeded, the memory core deleting the encrypted content and the encryption key if the memory core receives a request for deletion of the encrypted content and the encryption key.

5. A memory card according to claim 4, wherein the binary counter of the memory core interface counts the amount of content reproduced, in response to a request for reproduction of a content, and the memory core outputs the encrypted content to the memory core interface if the reproduction request does not cause the amount of possible content reproduction to be exceeded if a request for reproduction of a content is input to the memory core.

6. A memory card according to claim 4, wherein the binary counter of the memory core interface counts the number of times of content reproduced, in response to a request for reproduction of a content, and the memory core outputs the encrypted content to the memory core interface if the reproduction request does not cause the number of times of possible content reproduction to be exceeded if a request for reproduction of a content is input to the memory core.

* * * * *